(12) United States Patent
Cottle et al.

(10) Patent No.: US 11,577,858 B2
(45) Date of Patent: Feb. 14, 2023

(54) BAGGAGE AND PARCEL HANDLING SYSTEM

(71) Applicant: Leidos Security & Automation Limited, Kempston (GB)

(72) Inventors: Richard Cottle, Birmingham (GB); Luke Thomas Woods, Cheshire (GB); William Edward Watt, Bedfordshire (GB); Michael William James MacDonald, Barton le-Clay (GB); Velibor Kilibarda, Southfield, MI (US); Kenneth Hamel, Bloomfield Hills, MI (US); Freddie Tappo, Sterling Heights, MI (US); William Frazer, Wixom, MI (US); Bryan Finzel, Macomb Township, MI (US); Martin Kinsella, Bloomfield, MI (US)

(73) Assignee: Leidos Security & Automation Limited, Kempston (GB)

( * ) Notice: Subject to any disclaimer, the term of this patent is extended or adjusted under 35 U.S.C. 154(b) by 0 days.

(21) Appl. No.: 17/200,499

(22) Filed: Mar. 12, 2021

(65) Prior Publication Data
US 2021/0284358 A1 Sep. 16, 2021

Related U.S. Application Data

(60) Provisional application No. 62/988,412, filed on Mar. 12, 2020.

(51) Int. Cl.
*B64F 1/36* (2017.01)
*B65G 35/00* (2006.01)
*B65G 43/08* (2006.01)

(52) U.S. Cl.
CPC .............. *B64F 1/368* (2013.01); *B65G 35/00* (2013.01); *B65G 43/08* (2013.01); *B65G 2201/0258* (2013.01); *B65G 2201/0264* (2013.01); *B65G 2203/044* (2013.01)

(58) Field of Classification Search
CPC .......... B64F 1/368; B64D 9/00; B65G 35/00; B65G 43/08; B65G 47/71; B65G 2203/044; B65G 2201/0258; B65G 2201/0264
USPC ......................................................... 198/358
See application file for complete search history.

(56) References Cited

U.S. PATENT DOCUMENTS

| | | | |
|---|---|---|---|
| 3,695,462 A * | 10/1972 | Sullivan .................. | B64F 1/366 414/273 |
| 6,871,608 B2 * | 3/2005 | Rosen ..................... | B63B 1/121 114/61.1 |
| 7,575,112 B2 * | 8/2009 | Lowes .................... | B64F 1/368 198/350 |

(Continued)

OTHER PUBLICATIONS

International Search Report and Written Opinion for Application No. PCT/US2021/022216, dated Jun. 11, 2021, 15 pages.

(Continued)

*Primary Examiner* — James R Bidwell
(74) *Attorney, Agent, or Firm* — McCarter & English, LLP

(57) ABSTRACT

A bag handling system for a mass transit environment is disclosed. The bag handling system includes a first set of autonomous automated guided vehicles and a second set of autonomous automated guided vehicles. The first and second sets of autonomous automated guided vehicles are configured to transport bags through one or more bag processing areas.

20 Claims, 21 Drawing Sheets

(56) References Cited

U.S. PATENT DOCUMENTS

| | | |
|---|---|---|
| 9,317,034 B2 * | 4/2016 | Hoffman ............... G05D 1/0027 |
| 9,334,115 B2 * | 5/2016 | Bartelet ................... B65G 1/10 |
| 10,421,559 B2 | 9/2019 | Soudbakhsh |
| 10,946,983 B2 * | 3/2021 | Svenningsen ........... B64F 1/368 |
| 2014/0241837 A1 * | 8/2014 | Bartelet ................. B64F 1/368 |
| | | 414/277 |
| 2016/0244184 A1 * | 8/2016 | Alderman ............ G05D 1/0297 |
| 2017/0200248 A1 * | 7/2017 | Murphy ................. B62B 3/005 |

OTHER PUBLICATIONS

International Preliminary Report on Patentability for Application No. PCT/US2021/022216, dated Sep. 22, 2022, 10 pages.

\* cited by examiner

SECURITY AND SORTING

BAGGAGE AND PARCEL HANDLING SYSTEM

RELATED APPLICATIONS

The present application claims priority to and the benefit of U.S. Provisional Application No. 62/988,412, filed on Mar. 12, 2020, the disclosure of which is incorporated by reference herein in its entirety.

TECHNICAL FIELD

This disclosure relates to systems, devices, and methods for handling baggage, luggage, freight, or other parcels at high volume quantity or mass transit facilities. In one example application, the inventive systems, devices, and methods are useful in receiving, security screening, sorting, and routing baggage, luggage, freight, or other parcels for loading into an airplane's hold at airports.

BACKGROUND

In today's global and fast-moving economies, passenger mass transit, and in particular air travel, continues to rapidly increase. With the increase in passenger airline travel, there is increased pressure on airlines and airports to move the passengers and their checked luggage through the airports as quickly and efficiently as possible. An important area of passenger satisfaction is the receipt and processing of passenger checked bags from the place of departure and delivery at the intended destination. Few things frustrate airline passengers more than arriving at a destination and not receiving their luggage.

Conventional handling of checked passenger bags at airports is a complex system of equipment, security checks and processes. The process generally begins when passengers check one or more bags at a main terminal airline check-in counter or kiosk. Each bag typically receives a coded information tag with a unique identification number (typically a 10 digit number) that references passenger information including airline, flight number, transfer information, destination, and class of service, for example first class or economy. Each of these information tags are scanned and tracked by a large computer logistics system designed to ensure that each bag is timely loaded onto the proper airplane and routed to each passenger's final destination.

Following check-in in a main terminal, each bag is typically routed through a security screening area and then onto a passenger's aircraft stand or luggage make-up module. Conventional airport baggage handling and sorting systems typically involve a complex system of possibly hundreds of conveyors and bag sorting devices to separate and route bags through a security screening process and subsequently to the proper passenger terminal and departure gate.

Conventional complex luggage conveyor systems are further subject to mechanical failure. Conventional conveyor systems are often highly interconnected and provide only one pathway for a bag to reach its assigned location for loading. If a conveyor along that singular path fails, the system lacks flexibility to re-route bags along a different path, leading to a broad system shut down and delayed delivery. This one-way or limited pathway design includes the security screening area which reduces bag screening efficiency and leads to underutilized screening devices.

Typically, the terminal-sorted bags are gathered at a ramp-level holding or loading area where the bags are further sorted for specific flights. For example, bags that are pre-sorted for a particular flight, but have a transfer to an additional flight or alternate final destination, are typically further sorted from bags that are scheduled to next reach a final destination for delivery to the passenger. This conventional ramp-level sorting is highly manually-intensive and performed in areas exposed to harsh environmental conditions take a further toll on human bag handlers and equipment. This is further complicated by bag transfers to different flights which often occur in the harsh environmental conditions.

The flight-sorted bags are conventionally then loaded into baggage carts or containers, commonly called unit load devices (ULDs), for transfer onto the airplane. Depending on several factors including the size of the airplane, the filled/loaded ULDs may be closed/secured and loaded onto the airplane in large baggage hold areas below the passenger compartment. For smaller planes, it is also common for the baggage to be transferred adjacent to the airplane in baggage carts where the bags are manually unloaded from the baggage carts and placed on portable conveyors to move the bags from ramp level up into the airplane baggage hold compartment.

Even in the most sophisticated and automated baggage handling systems, at several places between baggage check-in and loading of the airplane, bags must be manually handled by operators for various reasons and purposes. One area typically requiring manual bag handling (or human intervention) is the loading of bags into the ULDs or other baggage carts for transport of the bags from the passenger terminal to the airplane. This is due to many reasons, including the almost unlimited differences in the sizes, shapes, rigidity, volumes, and weights of passenger bags. For example, the high variation in the physical characteristics of passenger bags has made it very difficult to automate, for example using programmable robots, the physical loading of all bags into a ULD or baggage cart (itself having a definite size, shape and volume).

Due in large part to the physical variations of bags, and the difficult harsh environment that these conventional operations often take place, the level of human physical effort and complex ergonomic movements to complete these physical bag loading/unloading tasks is high.

Further, the physical space or hold compartment(s) on airplanes to store and secure baggage and other cargo is at a premium. For larger airplanes that receive the ULDs in the baggage hold, it is advantageous that the ULDs be as fully-loaded with bags or other cargo as possible to minimize the number of ULDs needed, and/or maximize the bag/cargo carrying capacity per flight. Again, due in large part to the physical variations of bags noted above, attempts at automating the loading of ULDs or baggage carts have still required a high level of human involvement and manual activity. For example, when a ULD is almost full or has an irregular-shaped void space to receive a bag, automated systems and robots are not capable of choosing a bag of the appropriate size and shape to fit in the remaining ULD space. This reduces the loading or packing efficiency of the ULD and the airplane hold compartments in general. Unused airplane hold space can result in a potential loss of revenue.

There is a need for devices and methods that would solve or improve on these difficulties and disadvantages in handling and loading passenger bags, cargo and/or parcels in high volume sorting and distribution facilities.

SUMMARY

Disclosed is a transit baggage handling system for high-volume or mass transit airports. The inventive systems, devices, and methods are further useful in high volume quantity parcel or cargo applications where parcels, or other boxes or containers, need to be received, sorted, and routed to an assigned destination.

In an example application for airline passenger checked bags at an airport, the inventive system includes use of a plurality of first automated guided vehicles (AGV1s). Each AGV1 includes a uniquely identified tray used to support and autonomously transfer a passenger checked bag from a check-in area to a security screening area. In one example, each AGV1 is autonomously propelled and guided by a central, and/or a regional, control system based on one or more bag specific metrics available from a coded tag attached to each bag and additional metrics received from the central or control system.

On clearing of the respective bags from a security screening area, the AGV1s and onboard bags are autonomously driven to an assigned flight staging lane based in part on an assigned bag metric from the bag tag, for example a flight number, unique bag identification number, or other bag metrics such as bag size, class of passenger service or downstream destination. Upon the AGV1s entering the assigned flight staging lane, the bags may be further sorted by other assigned metrics, for example bag specific metric.

In one example, the AGV1s with onboard bags are further automatically sorted and sequenced by the autonomous AGV1s within the flight staging lane by a second assigned bag specific metric, for example, bag size, weight and/or type of bag.

The bags positioned in each respective flight staging lane are selectively and autonomously advanced by the central or regional control system into an assigned make-up module or area where the bags are removed from the AGV1s and deposited in a container or carrier, for example a ULD, used to transfer the bags to the specific aircraft stand or other staging area. In one example of a make-up module, the bags are loaded into a container in an automated load cell by one or more automated devices, for example automated, multi-axis robots. Alternately, the bags may be loaded into a container in a manual loading cell by human bag handlers. In another example, the bags for a specific flight may be partially loaded into the container in the automated load cell, and then the partially-filled container is autonomously moved to the manual load cell where bag handlers will manually fill the remainder of the container to capacity as needed.

In one example of a make-up module, the make-up module can include two elevators opposingly spaced from each other so that the elevators are positioned on opposing sides of a path that the AGV1s travel through the make-up module. The elevators can independently and cyclically move empty containers positioned on second automated guided vehicles (AGV2s) from a transfer cell on a ground/ramp level to the make-up module for bag loading, and then move the AGV2 and onboard loaded container from the make-up module back to the ground/ramp level transfer cell.

In one example of a ground/ramp level transfer cell, delivery carts carrying empty containers on the ground/ramp level are positioned in sequential rows in a cart entry area. AGV2s receive empty containers from the delivery carts for transfer by the elevators to the make-up module for bag loading. On return of the AGV2s by the elevators from the make-up module to the transfer cell, the loaded AGV2s are positioned in a cart exit area to transfer the loaded containers back onto the delivery carts for transfer to the aircraft stand, or other staging area.

In one example of transferring empty and loaded containers onto and off of the delivery carts, powered or non-powered roller platforms are used to assist, or automatically, transfer the containers to and from the AGV2s.

The inventive devices and methods have many advantages over prior high quantity transit baggage handling systems. One advantage is in the flexibility of the system in the security screening area to address bags that are immediately cleared, bags that need to be rescreened, and bags that need a higher level or manual inspection. Another advantage is that the sorting and loading of the bags into containers by an assigned bag metric, for example flight number, is all done inside an environmentally-controlled facility building. Further, the inventive make-up modules provide greater efficiency and flexibility to achieve fully-loaded containers by either completely automated loading, manual loading, or a combination of automated and manual loading. Additional disclosed automated devices and processes for moving bags to and from AGV1s, and to and from AGV2s and delivery carts, further increase the speed, efficiency, robustness, and flexibility of the system. Additional advantages known by those skilled in the art are achieved.

Any combination and/or permutation of the embodiments are envisioned. Other objects and features will become apparent from the following detailed description considered in conjunction with the accompanying drawings. However, it is to be understood that the drawings are designed as an illustration only and not as a definition of the limits of the present disclosure

BRIEF DESCRIPTION OF THE DRAWINGS

To assist those of skill in the art in making and using embodiments of the present disclosure, reference is made to the accompanying figures, wherein elements are not to scale so as to more clearly show the details, and wherein like reference numbers indicate like elements throughout the several views.

DETAILED DESCRIPTION

Referring to FIGS. 1-16, examples of a baggage and parcel handling system 10 and methods 500 are disclosed. The system and methods can be useful in a high-volume quantity, mass transit airport. Other applications of embodiments of the present disclosure can include, but are not limited to mass transit trains, busses, and sea travel facilities. Further applications include high volume quantity parcel, container or other cargo receipt, sorting and/or distribution centers. Embodiments of the present disclosure can be useful in other applications as known by those skilled in the art. The terms bag, bags, baggage or luggage refer to mass transit checked passenger bags or luggage, as well to other parcels, containers, freight, boxes, and other structures which are received, and must be sorted and routed for further processing at commercial facilities, such as, for example, airports.

Figure 1:
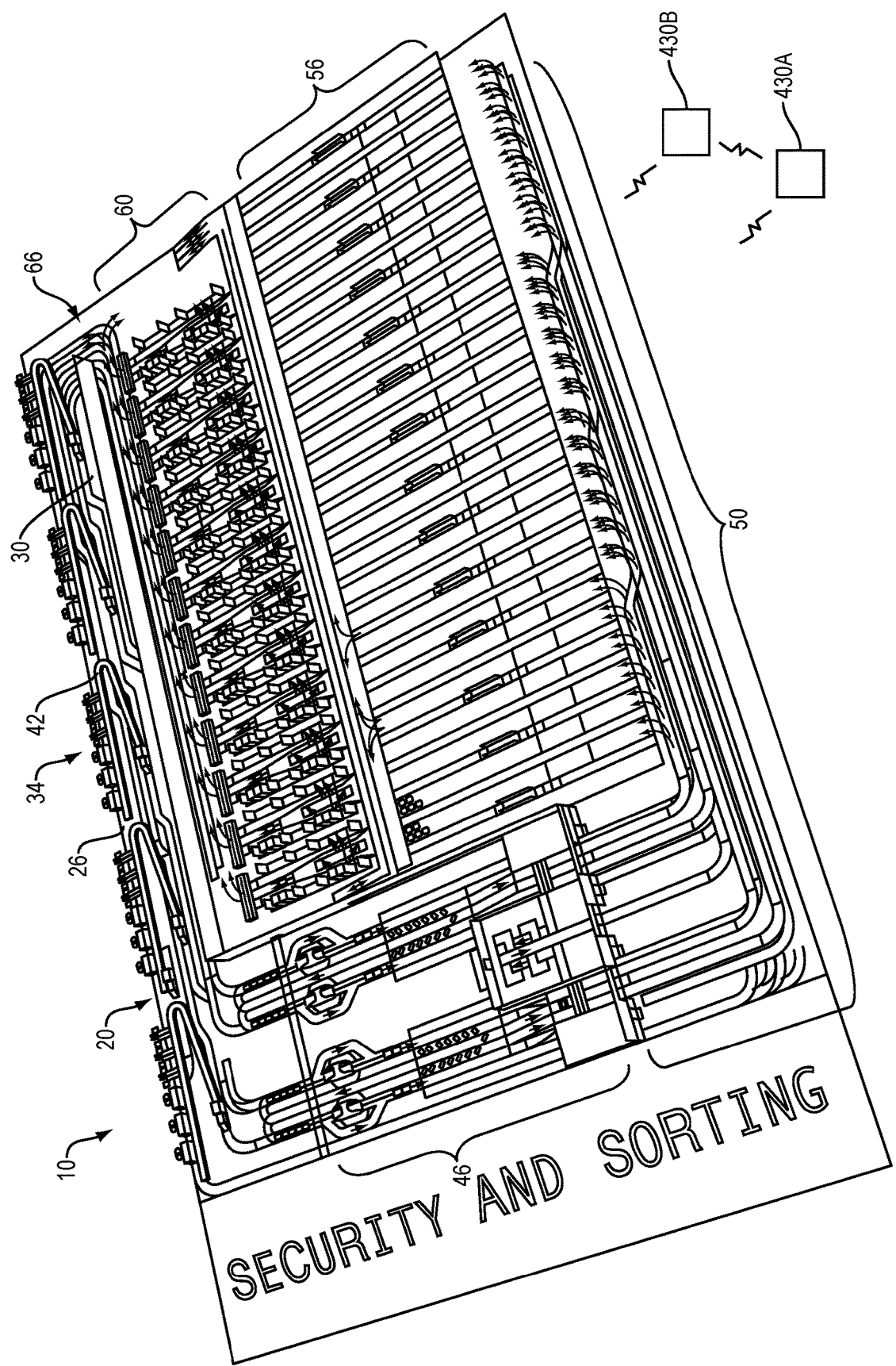
FIG. 1 is schematic perspective view of one example of a first floor of an airport baggage handling area according to embodiments of the present disclosure.
Figure 2:
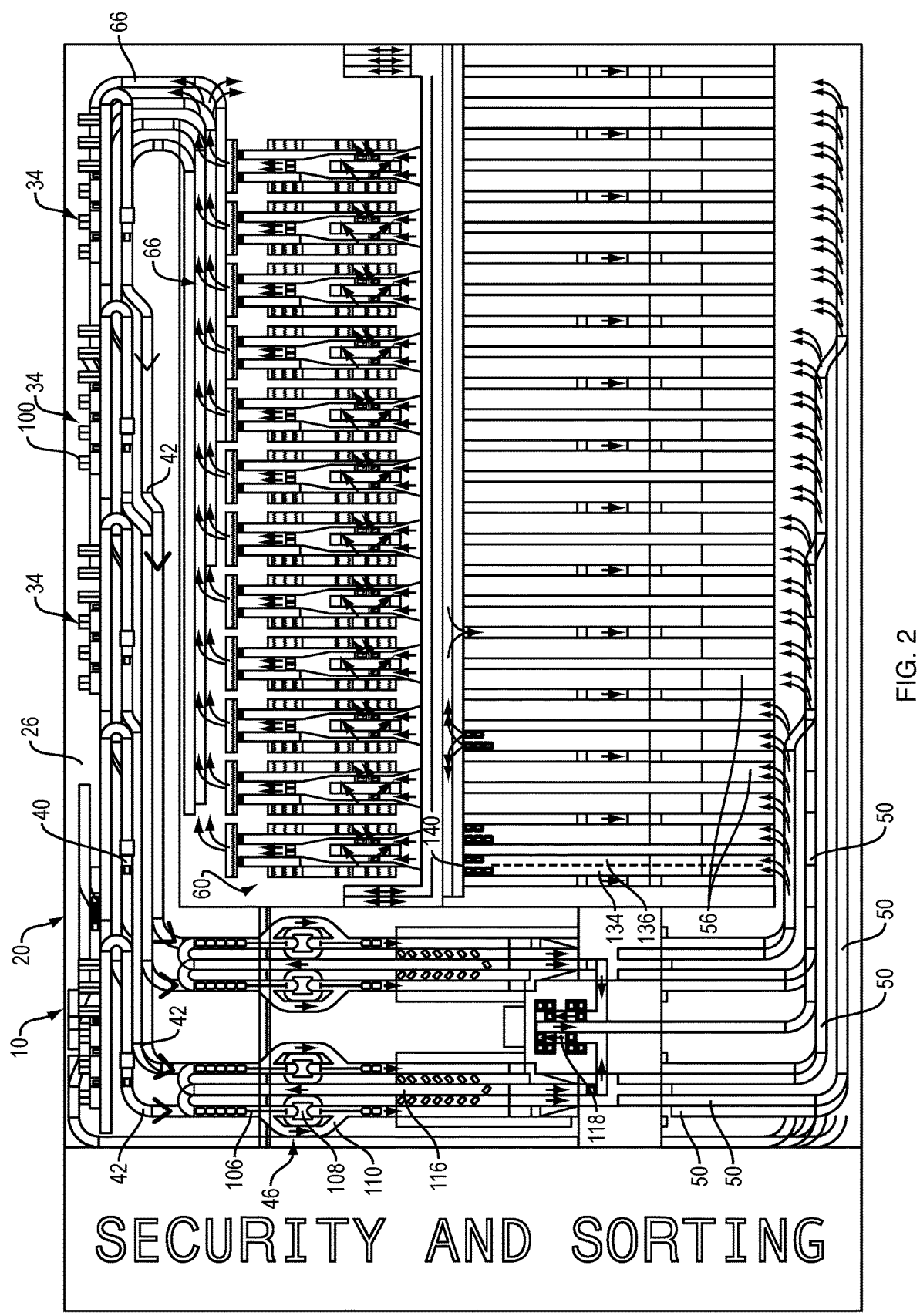
FIG. 2 is an enlarged top view of a portion of the example shown in FIG. 1.
Figure 2A:
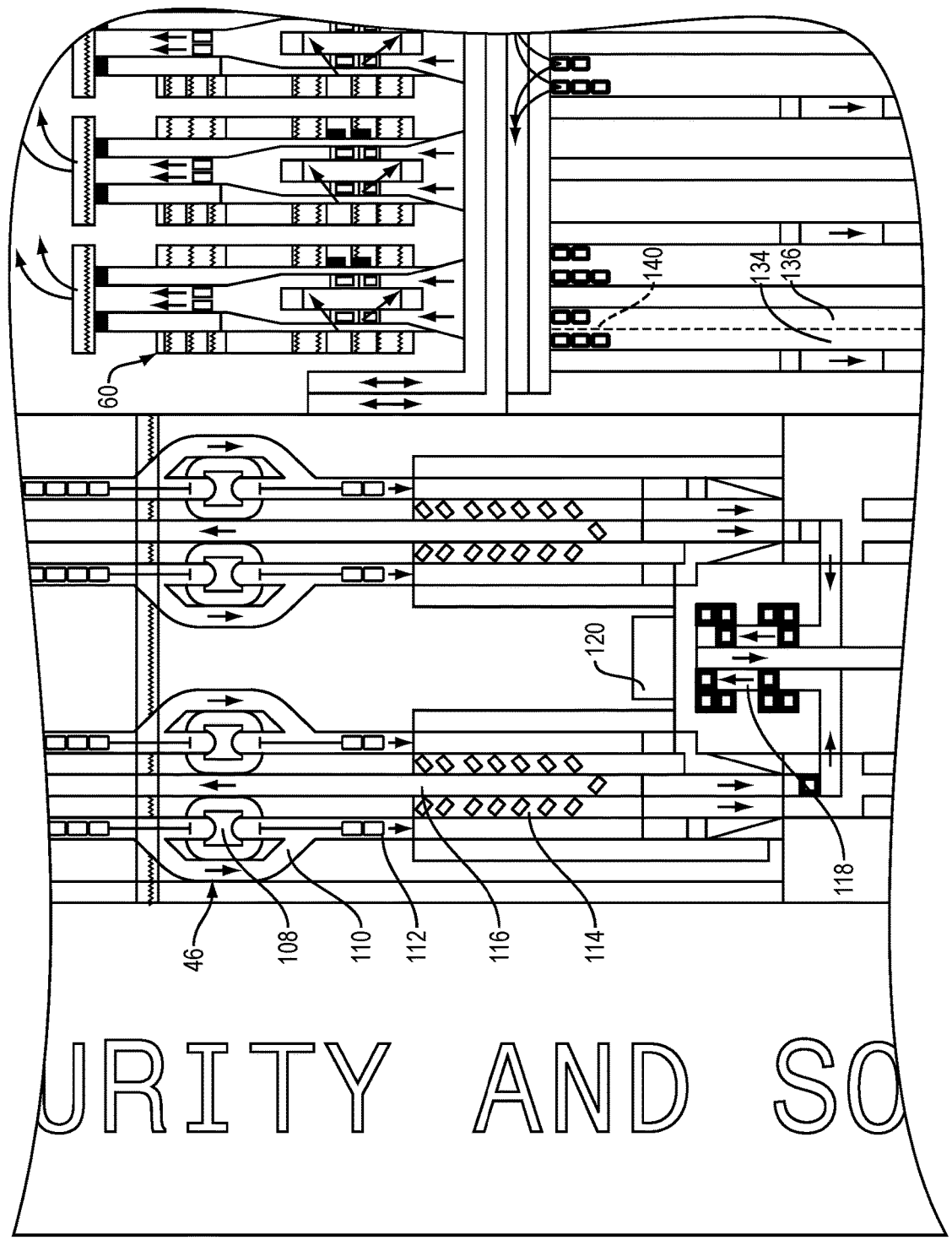
FIG. 2A is an enlarged area of a security scanning area shown in FIG. 2.
Figure 7:
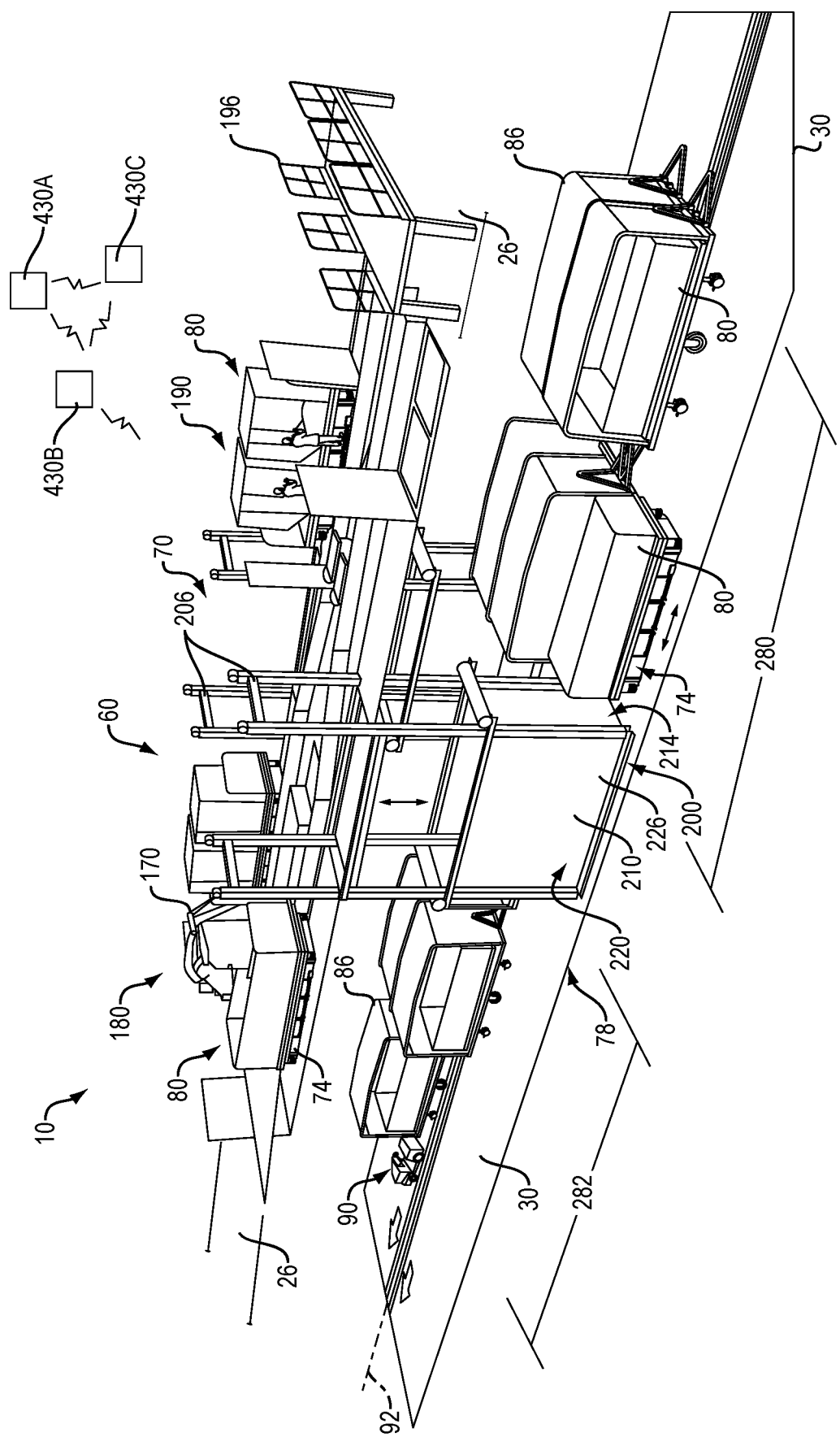
FIG. 7 is a schematic right side rearward perspective view of a portion of FIG. 5.

Referring to FIGS. 1 and 2A, the mass transit luggage handling system 10 is shown in an exemplary, not exclusive, application in a large, mass transit airport 20. In the example as best seen in FIGS. 1 and 7, system 10 is shown in a two-level or two floor building configuration having a first level or floor 26 and a second or ground level (also referred to as the ramp level) 30 positioned below the first level 26. In an alternate example, the system 10 includes four levels or floors, a ticketing level on a third level or floor, security screening and temporary baggage holding area on a second level, flight staging and make-up module on a first level, and a transfer cell on a ground/ramp level. It is understood that system 10 can be applied to fewer or additional levels or floors depending on the structure of system 10, the building floor space, building features, security protocols, and volume capacity of the airport 20. It is further understood that the first level 26, and other levels described herein, can be positioned below the ground/ramp level, for example in a level below the ground floor.

Figure 3:
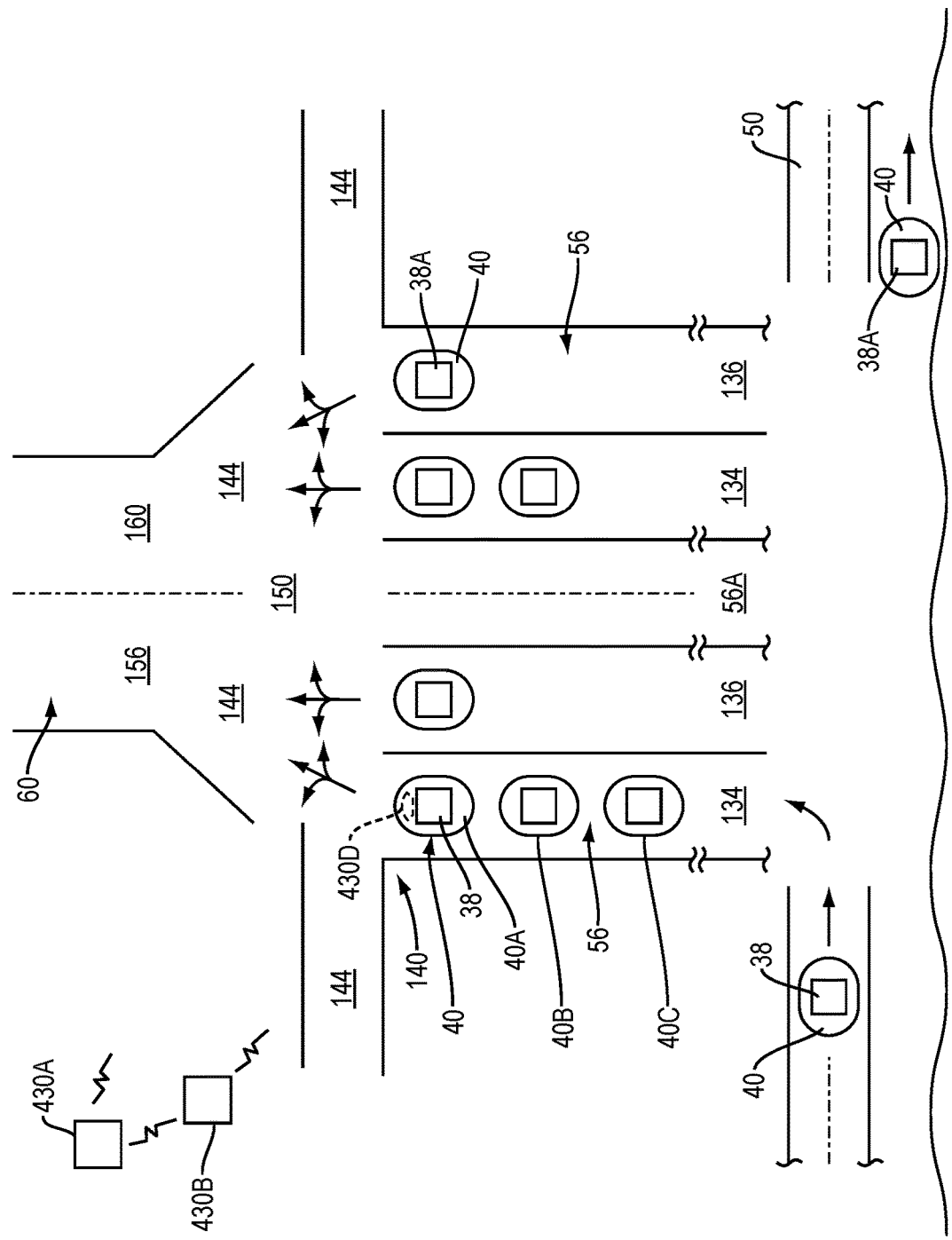
FIG. 3 is an enlarged top view of a portion of FIG. 2 showing exemplary flight staging lanes.

Referring to FIGS. 1-3, system 10 includes a passenger baggage check-in area 34 where passengers check bags 38 that will not be physically carried onto the plane by the passenger. At the check-in area 34, each checked bag 38 receives a coded, scannable bag tag that is linked to specific passenger information and/or can be linked to other metrics assigned to that bag, such as, for example, bag size, bag weight, bag type, class of passenger service or downstream destination. In one example, the device used to print the bag tags is in communication with a departure control system (DCS) that contains a database for the passenger information linked or associated with a unique 10-digit bag identification number.

In one example of system 10, each checked bag 38 is then placed or deposited on a tray supported by a first automated guided vehicle (AGV1) (or alternately called a luggage transfer vehicle—LTV) 40 which receives, processes and stores data signal instructions that can be wirelessly received from a central control system 430A or a regional control system (alternately LTV control system) 430B based on flight metrics and/or bag metrics described herein for movement along an assigned path of travel.

As shown in FIG. 2, exemplary system 10 includes a plurality of pre-screening paths of travel 42 for the AGV1s 40 to advance toward a baggage security screening area 46. In the security screening area 46, each checked bag 38 is internally screened for hazardous or dangerous materials. As discussed further below, several alternate paths of travel in the screening area 46 may be utilized by system 10 depending on the outcome of the security screening of each bag 38.

As further described herein, once a respective bag 38 is cleared for advancement from security area 46, each AGV1 40 and onboard bag 38 can be autonomously propelled and guided in response to instructions received from the central control system 430A, or regional AGV1 control system 430B, to a sorting path of travel 50 downstream of security area 46 toward flight staging lanes 56. As shown in FIGS. 2A-B and 3, as one example, each flight staging lane 56 is actively and selectively assigned for a specific flight number by the central control system 430A. The central control system 430A, using information metrics consistent with the coded bag tag information, can autonomously send instructions to the AGV1s 40 to direct and guide the AGV1s 40 transporting security cleared bags for that flight number to the assigned flight staging lane 56 for the flight number. In one example, each AGV1 40 and onboard bag(s) 38 that are temporarily queued in a particular flight staging lane 56 may be further organized or sorted by one or more other bag metrics consistent with the passenger name record (PNR), for example class of fare, rewards program level, downstream destination and/or, for example, bag metrics including size, weight or bag type (for example non-robotic loadable).

With reference to FIGS. 1, 2, 5-7, exemplary embodiments of system 10 can include a plurality of make-up modules or areas (or alternately called luggage make-up modules LMM) 60. The bags 38 that have already been presorted by an assigned metric, for example flight number, can be removed from the respective AGV1 40 and loaded into containers 80 (for example ULDs 360, carriers 370, or trays 380) designated for that specific flight at the make-up modules 60. In one example, each bag 38 is removed from the respective AGV1 by a robot, or manually by a human operator, or through a combination of robots and manual efforts, and loaded into a container 80 supported by a second automated guided vehicle (AGV2) 74. Once the bags 38 are removed from the respective AGV1 40 in the respective make-up module 60, the empty AGV1s 40 can automatically navigate along a AGV1 return path 66 to the check-in area 34 or bag acquisition area for receipt of another bag 38. As discussed further below, the status of AGV1s 40 may be checked, for example the status of the battery charge, and corrective or maintenance operations, for example charging or replacement of the AGV1 40 battery, may take place before returning to receive another bag to start the process again.

The system 10 devices and processes of sorting of the bags 38 by flight number in flight staging lanes 56, and loading the bags 38 into containers 80 designated for a specific flight in make-up modules 60, can be completed on the first level 26 inside the environmentally controlled facility. This is a significant improvement from conventional ramp level sorting and container loading devices and processes which conventionally have been subject to harsh environmental and high activity conditions.

As shown in FIG. 7, each make-up module or area 60 includes one or more elevators 70 to cyclically raise empty containers 80 onboard respective AGV2s 74 from the ground/ramp level 30 up to the make-up module 60 on the first level 26 for the loading of bags 38. When each container 80 on first level 26 is full, the AGV2 74 and onboard full containers 80 are lowered by the elevator 70 to a transfer cell 78 on the ramp level 30. As further described herein, in the transfer cell 78 at ramp level 30, the AGV2s 74 automatically transfer the full containers 80 into delivery carts 86, which are connected to transfer vehicles 90 that travel along a path 92 either directly to the airplane departure gate for loading onto the airplane, or to a staging area 94 to await transfer to the departure gate.

Central and Regional Control Systems

In one example, system 10 can include a central luggage control system 430A and a local or regional control system 430B in communication with the central control system 430A. Each of the central control system 430A and regional control system 430B can include one or more of the hardware components shown in FIG. 14 as well as operating system(s), and software to execute the features and functions described herein.

In the example, the central control system 430A is in communication with the regional control system 430B as well as other control and data systems including, but not limited to, the departure control system (DCS), flight schedule and gate assignment systems, passenger and baggage intake and flow information systems, and/or other regional or local control and information systems throughout the system 10 as described herein. In the example system 10, the central control system 430A can receive passenger data/information, bag data tag information, and data from other control and information systems of the system 10. Control systems 430A and/or 430B can monitor the AGV1s 40 and other devices in the system 10, and can individually select and assign destinations for each AGV1 40 based on calculations and determinations using the received data. Control systems 430A and/or 430B can transmit data signals to the AGV1s 40 to instruct the AGV1s 40 to propel and guide the AGV1s 40 to the assigned destinations based on the specific bag tag the bag onboard each AGV1 as well as other information and metrics received from the system 10.

The exemplary regional control system 430B can be used in conjunction with the central control system 430A to monitor and control an operation and/or function of the AGV1s 40, e.g., so that the AGV1s 40 travel along the described paths and perform the operation and functions described herein. Regional control system 430B can be used, and in communication with, sensors, vision systems, and other devices described herein, and data from the sensors, vision systems, and other device can be used by the regional control system 430B to provide instructions to the AGV1 40.

Figure 14:
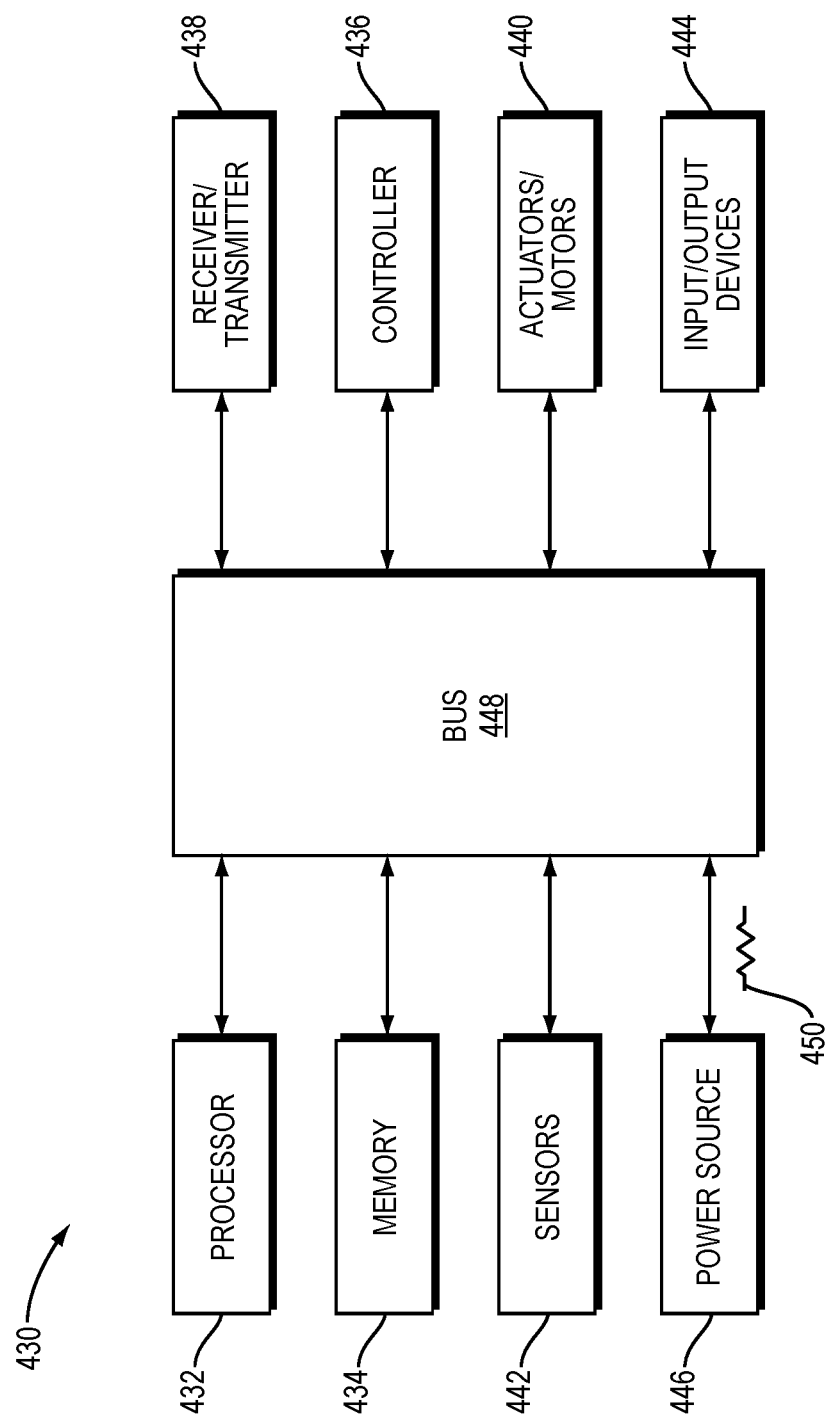
FIG. 14 is a schematic of an example of a control system useful as a central, local or individual device control system according to embodiments of the present disclosure.

In one example of system 10, each AGV1 40 includes an onboard control system 430D (FIGS. 3 and 14). In one example, in response to receipt of data signals from the central control system 430A and/or regional control system 430B, the AGV1 40 control system 430D can control or activate actuators/motors 440 (FIG. 14) of the AGV1 40 to propel AGV1 40 along one or more assigned paths of travel, and/or to one or more assigned destinations suitable for the onboard bag 38. The AGV1 40 is autonomously propelled and guided to the assigned areas or destinations as determined by the central control system 430A and/or regional control system 430B control system. Other methods of control and movement of AGV1s 40 can be used.

Baggage Check-in and Registration

Referring back to FIGS. 1 and 2, exemplary system 10 includes a baggage check-in area 34 (five shown in FIG. 1). Each check-in area 34 is typically a physical counter inside a passenger terminal, or a curb-side stand or kiosk, with an airline representative. Other check-in areas or configurations known by those skilled in the art can be used. In one example, an airline attendant manually prints and secures a coded bag tag onto each bag 38 and places the tagged bag onto a nearby conveyor belt. As described above, the bag tag includes scannable, unique identification coded information that references passenger information, for example, from the PNR and bag metrics specific for that particular bag 38, for example the specific flight number for that bag 38.

In one example, the printed bag tag, including the exemplary 10-digit bag identification number, is received from a DCS in communication with system 10 as generally described above. In one example, the bag tag serves merely as a reference to translate all of the passenger information and bag data/metrics stored in the DCS. The bag tag itself can be configured so that the bag tag does not contain or store the actual data/information in the tag itself (e.g., a printed label). The bag tag can take other forms and include additional or alternate information other than that described as known by those skilled in the art and/or can include a radiofrequency identification tag (RFID) tag or near-field communication (NFC) device encoded with the identification number. In one example, a conveyor belt transfers the checked and tagged bags 38 from the check-in area 34 to a nearby location at which each bag 38 is automatically transferred from the conveyor belt onto a tray of an awaiting AGV1 40. In the example, AGV1s 40 can be positioned or queued in an area near the end of the conveyor. In response to receiving instructions from the central 430A or regional control system 430B, an AGV1 40 is autonomously propelled and guided to the end of the conveyor to timely receive the bag 38. On arrival of the bag 38 at the end of the conveyor, the bag 38 is automatically transferred from the conveyor into the tray which is removeably or detachably positioned on the stationary, or moving, AGV1 40 passing underneath, or otherwise in alignment with, the conveyor. In one example, where the AGV1 40 is in motion, when the bag 38 is inducted into the tray on the AGV1 40, the movement of direction of the AGV1 40 as it approaches the end of the conveyor, is in the same direction of travel as the bag 38 on the conveyor to aid in successful engagement of the bag 38 to the AGV1 40 and tray. In one example embodiment, the AGV1s 40 and trays can each have unique identifiers such that when a bag is deposited in the tray o one of the AGV1s 40, the identifiers of the bag tag, the tray, and the AGV1 40 can be linked by the central control system 430A and/or the regional control system 430B until the bag is removed from the tray.

In one example, the queued AGV1s 40 are sequentially instructed by the central control 430A, or regional control system 430B through wireless data signals and respectively propelled and guided to sequentially receive bags 38 as the bags 380 continuously exit the conveyor. In the example, one or more sensors may be used on the conveyor to send signals to the control systems 430A and/or 430B to initiate movement of the respective AGV1 40 and properly time the arrival of the AGV1 40 at the end of conveyor to receive the bag 38 without slowing or stopping the conveyor providing for a continuous introduction of respective bags 38 onto awaiting, or moving, AGV1s 40. In one example, the bags 38 are sequentially spaced a predetermined length (or time) on the conveyor to assist in the sequence and timing of deposit on the sequentially arriving AGV1s 40. The sensors monitoring the conveyor can include optical sensors, cameras, acoustic sensors, and the like for tracking and determining locations of the bags 38 on the conveyor belt, which can be used by the central or regional control systems 430A and 430B in combination with a velocity of the conveyor belt to determine a time at which the bags 38 will reach the end of the conveyor. Alternately, a robot or other automated device can remove each bag 38 from the conveyor belt and deposit the bag 38 onto the AGV1 40, for example in a tray or bin detachably secured to the AGV1 40. In one example (not shown) the bags 38 may be placed on an awaiting AGV1 40 at the check-in area 34 as opposed to placing the bags 38 on the conveyor and subsequently transferring the bags 38 to the AGV1s 40.

In one example, at the time the bag 38 receives the bag data tag at the check-in area 34, the bag data tag is scanned and the information thereon is sent to the control system 430A and/or 430B to notify the control system(s) that the bag has entered the system or has been checked-in. Alternately, the bag tag may be scanned (or otherwise read or received) while traveling along the conveyor prior to induction with an AGV1. Each bag 38 may further be scanned to determine its general size, volume and/or weight using one or more sensors, such as optical sensors, camera, acoustic sensors, and pressure sensors.

In one example, the AGV1 40, and the tray positioned on the awaiting AGV1 40 can each include a RFID tag, or other device or indicia, which includes information specific to respective AGV1 40 and tray and allows each of the AGV1 40 and tray to be separately and individually read, and/or wirelessly transmit data/information signals, so each can be separately and individually logistically monitored or tracked by the central control system 430A and/or regional control system 430B throughout the airport 20.

On acquisition or engagement of the deposited bag 38 onto the awaiting AGV1 40, a scanner or other sensor can register or otherwise record that the specific bag 38 (and attached data tag) has been positioned onboard or engaged with the specific AGV1 40 and tray. This registration of the specific bag 38, AGV1 40 and tray can be wirelessly transmitted to the central control system 430A and/or the regional control system 430B. For example, one or more sensors or scanners can read or scan the RFID tags of the AGV1 40 and onboard tray, including unique identification data for each, while the AGV1 40 autonomously moves toward the conveyor, or is positioned at the conveyor awaiting deposit of the specific bag 38. The bag data tag can be scanned on the conveyor just prior to deposit onto the AGV1 40 and tray such that the control systems 430A and/430B can link identification number of the bag tag for the bag 38 with the identifiers for the AGV1 40 and tray. Other devices and methods to read and register that a specific bag is positioned in a specific tray and onboard a specific AGV1, as well as communicating that data to the control systems 430A and/or 430B can be used.

As best seen in exemplary FIG. 2, each check-in area 34 includes a prescan path of travel 42 (five shown in FIG. 1) extending toward the security screening area 46. The respective prescan paths of travel 42 can merge into fewer paths or lanes (e.g., from five to four paths) heading into scanning area 46 as shown. Exemplary embodiments of the system 10 can include greater or lesser numbers of prescan paths of travel 42, and different lengths and configurations of those paths of travel 42 can be used. In the example described above where the bags 38 are sequentially and automatically deposited or inducted one-at-a-time to each awaiting AGV1 40 positioned at the end of the conveyor from check-in area 34, the prescan paths of travel 42 can begin at the end of the conveyor where the bags 38 are acquired by the respective assigned AGV1s 40 and data registered with the central control system 430A or regional control system 430B or both.

In one example, a verification process can be used to check that the bag 38 is positioned on the AGV1 40. For example, one or more sensors, such as optical sensors, cameras, acoustic sensors can detect the bag 38 is positioned on the AGV1 40, where the sensors can be in communication with the central control system 430A and/or regional control system 430B 430A or regional control system 430B, or other devices and processes may be used. If a fault or missing bag is identified, the central control system 430A and/or regional control system 430B 430A and/or regional control system 430B is notified and, for example, the AGV1 40 without the bag 38 may be signaled to autonomously travel to a designated area for inspection or other remedial processing. In some embodiments, the AGV1 40 can determine that there is a fault or that the bag 38 is missing, and in response can travel to a designated area for inspection. In another example, if a bag 38 is engaged with the tray and AGV1 40, but is not positioned or sufficiently engaged with the tray to continue with the process, the AGV1 40 can autonomously travel to a designated area for inspection or other remedial processing. As one example, the AGV1 40 can determine that the bag 38 is not positioned or sufficiently engaged with the tray or can be signaled by the control systems 430A and/or 430B, which can determine is not positioned or sufficiently engaged with the tray.

Each AGV1 40 can include independent positioning and/or collision avoidance devices, sensors, software and/or controls. These devices provide, or assist the control systems 430A and/or 430B to actively sequence the AGV1 before or after other AGV1s, and avoid contact or collisions with other AGV1s, to quickly and efficiently advance each AGV1 40 along one of the prescan paths 42 to the scanning area 46. In an alternate example, the central control system 430A and/or regional control system 430B 430A and/or 430B monitors the position and movement of each AGV1 40 and directs and/or adjusts the movement and locational position of each AGV1 40 relative to other AGV1s 40 in the immediate area to avoid contact between AGV1s 40 and reduce or eliminate bottlenecks or "traffic jams" of the AGV1s 40 along the paths of travel described herein. In another example, the control system 430D (FIGS. 3 and 14)

onboard AGV1s 40, and/or the central control system 430A and/or regional control system 430B s 430A and/or 430B, can monitor and control the traveling speed of each AGV1 40 to achieve or maintain a predetermined or sufficient distance between the sequentially traveling AGV1s 40.

Security Screening

With reference to FIGS. 2 and 2A, exemplary bag security screening area 46 is in communication with the prescan paths of travel 42. In one example screening area 46 includes at least one (four shown) scanning conveyors 106 which receive, from the AGV1s 40 and transfer each tray and supported bag 38 through a bag scanning device 108 (four shown). In one example, each scanning device 108 is an explosion detection system (EDS) which scans the interior of each bag 38 and automatically analyzes the contents and/or displays the contents on a monitor (not shown) for review by a security attendant. The respective scanners 108 scan each bag 38 for hazardous, dangerous and/or explosive materials. Scanners 108 may use conventional scanning techniques, for example x-ray, computerized tomography (CT), or other suitable devices and methods.

Each AGV1 can be directed by data signals from the central control system 430A and/or regional control system 430B toward an assigned scanning conveyor 106 and scanner 108 depending on one or more metrics determined by the central control system 430A and/or regional control system 430B. For example, a particular scanner 108 may be available or have less bags waiting to be scanned than other scanners 108 or a particular scanner may be inoperative. Sensors, for example photoelectric devices (e.g., optical sensors) or camera vision systems can be in communication with the central control system 430A and/or control system 430B to provide feedback regarding the scanning conveyors 106 and/or scanners 108, which can be used by the central control system 430A and/or regional control system 430B to determine the data signals to be sent to the AGV1s 40 to instruct the AGV1s 40 to which scanning conveyors 106 and/or scanners 108 to navigate (e.g., the scanner to which the AGV1 40 has been assigned by the control systems 430A and/or 430B).

In exemplary screening area 46, each tray and supported bag 38 can be removed from the respective AGV1 40 and placed (or automatically deposited) on a respective and assigned scanning conveyor 106 for travel through the scanner 108 and then downstream from the scanner 108. The AGV1 40 that will receive the bag 38 and the tray can receive data signals from the central control system 430A and/or regional control system 430B 430A and/or regional control system 430B and can be automatically diverted and guided to a path of travel 110 around the scanner 108 to a location for receiving the bag 38 and tray. In one example, each AGV1 40 can be autonomously propelled and guided by data signals from the central control system 430A or regional control system 430B along path of travel 110 to a bag induction area 112 to await reacquisition or re-engagement with the tray and bag 38.

In one example, the trays and respectively supported bags 38 exiting the scanners 108 are automatically deposited or re-inducted in the induction area 112 onto the same AGV1 40 which previously delivered the tray and supported bag to the scanning conveyor 106. Alternately, the tray and supported bag can be deposited onto a different AGV1 40 that is positioned to receive the tray and bag on exit from the scanning conveyor 106 in induction area 112. In one or both examples, on redepositing of the tray and supported bag 38 with the automatically positioned and awaiting AGV1 40 as directed by the central control system 430A and/or regional control system 430B 430A and/or regional control system 430B, one or more sensors (e.g., RFID reader, barcode scanner, optical scanner) can be used to register and/or verify the tray ID and AGV1 ID (for example provided by the RFID tags affixed to the tray and AGV1 described herein), and the bag tag on the bag 38. This registration or verification is sent by a wireless data signal to the central control system 430A and/or regional control system 430B 430A and/or regional control system 430B, which can confirm that the tray and bag 38 have been received the AGV1 40 to which they have been assigned.

Removal and deposit of the trays and respective supported bags 38 on and off of the respective AGV1 40, and to and from the scanning conveyors 106, can be automated. For example, a programmable robot, or passive or active aligned ramps, may automatically engage and remove/deposit the tray and supported bag to and from the AGV1 40. Other suitable devices and methods for transferring the trays and supported bags 38 to and from scanner conveyor 106 and AGV1s 40 can be used.

In one example, the trays and supported bag(s) 38 onboard the respective AGV1 40 are not removed from the AGV1 40, such that the bag scanner 108 allows for the AGV1 40 to drive through the scanner 108 with the tray and bag 38 still onboard the AGV1 40. Alternately, the scanning device or process otherwise does not require the tray and bag 38 to be removed in order to sufficiently scan the bag internal contents.

Alternate Scanned Bag Paths of Travel Prompt Bag Clearance

Referring to FIG. 2A, in one example, the security baggage screening area 46 clears or approves the scanned bag 38 by the time the tray and bag 38 are redeposited onto AGV1 40 at the bag induction area 112 or by the time the AGV1 40 with the tray and bag 38 drives through and exits the scanner. In this instance, the central control system 430A and/or regional control system 430B 430A and/or regional control system 430B can transmit data signals to the AGV1 40 to instruct the AGV1 40 to be propelled and guided from the screening area 46 toward the next assigned destination as determined by the central control system 430A and/or regional control system 430B 430A and/or regional control system 430B. For example, the AGV1 40 transporting the cleared bag 38 can be directed to travel to a flight staging lanes 56 or an alternate AGV1 flight staging or holding area until signaled or instructed to travel to the next assigned destination by the central control system 430A and/or regional control system 430B. When the AGV1 40 exiting the screening area 44 with the cleared bag 38, a signal may be sent by a sensor at the scanning area 44, or by the AGV1 40, to the central control system 430A and/or regional control system 430B 430A and/or regional control signal 430B.

Queueing Area

With reference to FIG. 2A, in one example of system 10, a queueing area (alternately referred to as on-screen resolution (OSR) dwell area) 114 can be used to temporarily park or hold AGV1s 40 and the onboard tray and bag 38 while extended, or unusually long, processing of the scanner 108 information takes place. For example, if the security scanning system and/or scanner 108 information takes longer than a predetermined time period to determine whether the bag 38 will be cleared, or may require rescanning or manual inspection, the particular AGV1 40 assigned to the tray and bag 38 can be signaled by the central control system 430A and/or regional control system 430B, to provide instructions to the particular AGV1 40 to be autonomously guided into the queueing area 114 pending resolution of the security screening process. In an alternate example, where the throughput of bags 38 exceeds the speed of processing or analyzing the scanner 108 data, all AGV1 40 may be directed to park in queueing area 114. In an alternate example, only AGV1s 40 that have not received a cleared security status within a predetermined time period, for example 30-120 seconds, are guided to queueing area 114 as described above. Other metrics or factors to determine whether an AGV1 40 will be guided to queueing area 114 can be used. Other time or time period ranges can be used depending on the airport, airport logistics, available personnel, and other factors.

On determination from the baggage screening area 46 (for example as determined by a local security screening area control system in communication with the central control system 430A and/or the regional control system 430B) that the specific bag 38 is cleared/safe and communication of that cleared status signal is received by the central control system 430A and/or the regional control system 430B, the central control system 430A and/or regional control system 430B signals the particular AGV1 40 with the cleared bag 38 of a new assigned destination to instruct the particular AGV1 40 to be autonomously propelled and guided out of the queueing area 114 toward the assigned next destination, for example the flight staging lanes 56 or a AGV1 staging area as described herein.

Bae Rescanning

Still referring to FIG. 2A, in one example of system 10, baggage scanning area 46 includes a rescanning return lane 116 as generally shown. In some instances, the scanned information from scanners 108 is not sufficient or useful in determining whether to clear a bag 38 requiring a rescanning of the bag by scanners 108. On receipt of a data signal from scanning area 46 to the central control system 430A and/or regional control system 430B to rescan a particular bag 38, central control system 430A and/or regional control system 430B transmits data signals to the AGV1 40 supporting that bag 38 to instruct the AGV1 40 to be autonomously propelled and guided from the induction area 112, or out of the queueing area 114, into and along rescan return lane 116. As shown in FIG. 2A, rescan return lane 116 provides a path of travel for the AGV1 40 to travel back upstream to prescan path of travel 42 so the tray and bag 38 can be resequenced with incoming AGV1s and deposited back onto a prescan conveyor 106 for rescanning by scanners 108 in a manner described above. One or more sensors/signals may be sent to/from the central control system 430A and/or regional control system 430B to check or verify the location of the redirected AGV1 as it travels along the rescan return lane 116.

Manual Inspection

Still referring to FIG. 2A, in one example of system 10 where baggage scanning area 46 denies clearance of a bag 38, the AGV1 40 has been positioned in queueing area 114 for too long a time period, or the bag 38 will require, for example manual inspection, a local control system for scanning area 46 can signal the central control system 430A and/or regional control system 430B. On this determination, the central control system 430A and/or regional control system 430B can transmit data signals to the AGV1 40 to instruct the AGV1 40 to be autonomously propelled and guided from the induction area 112, or the queueing area 114, into and along a manual inspection path of travel 118 toward a reconciliation room (or alternately called manual bag 38 inspection area) 120 where a security officer can further inspect the bag 38 for unauthorized materials (or other more intrusive inspection process takes place).

In one example, reconciliation area 120 is located on a different floor or level than the bag scanning area 46 which, for example, may provide a higher level of safety or security than the scanning area 46. If area 120 is on a different floor/level, angled ramps and access openings between floors may be used for continuous movement of the AGV1s between the areas 46 and 120. Sensors or other devices in communication with the central control system 430A and/or regional control system 430B can be used to confirm/verify the position along manual inspection path 118 and the arrival and exit from reconciliation area 120. IN response to clearance of the bag 38 in reconciliation area 120, the central control system 430A and/or regional control system 430B are signaled, and the AGV1 40 receives instructions from the control systems 430A and/or 430B to be propelled and guided to a next assigned destination. Other devices, methods, path of travel and area locations and configurations, location on floors or levels, and processes for rescanning and/or manually inspecting bags 38 can be used.

Each of the rescan return lane 116 and manual inspection path or lane 118 is a significant improvement over conventional systems as the rescan and manual inspection processes do not interrupt the flow or throughput of cleared bags 38 (and travel of associated AGV1s) which may continue along a path of travel toward the respective next assigned destination.

Each of the queueing area 114, rescan return lane 116, and manual inspection path 118, and the ability of the autonomously propelled and guided AGV1s 40 to be selectively and automatically directed to these areas by central control system 430A and/or regional control system 430B, represent significant improvements over conventional baggage transfer devices and systems. Embodiments of the system advantageously provide for significant flexibility over conventional systems in instances where bags 38 need to be rescanned or manually inspected without impeding the progress or throughput of bags 38 that have been cleared by the scanning area 46. By independently and autonomously directing the AGV1s to one of these alternate areas, conventional manual intervention is greatly reduced or eliminated increasing system efficiency and safety.

Flight Staging Area

AGV1s 40 transporting bags 38 that have been cleared via the screening area, but are too early to be further processed for a particular flight can be instructed by central control system 430A and/or regional control system 430B to autonomously travel to a flight staging or holding area. The flight holding area can be a large room or area remote from, but in communication with the flight staging lanes 56, for example on a floor or level above or below the screening area 46 level. Another example of use of a flight holding area can be to hold transfer bags that have arrived at the airport 20 for future flights that do not leave for many hours, The flight staging area (alternately called flight holding area) can include lanes or designated areas that are assigned by central control system 430A, or a local control system for the flight staging area, according to one or more metrics, for example, similar flight departure times, or the same flight number. The AGV1s 40 in this area can be propelled and guided in the manner described and queued in an assigned holding lane. When positioned in the assigned lane, each AGV1 40 may automatically advance in the lane, but can be autonomously controlled to stay separated from other queued AGV1s in the assigned lane. Alternately, the central control system 430A or a local control system for the flight staging area can send data signals to the queued AGV1s in the staging area to instruct the AGV1s 40 to advance in the lane to maintain order and efficient progression of the AGV1s. Sensors may be used to detect the position, numbers, and IDs of the AGV1s in a particular holding lane and can transmit signals the central control system 430A, regional control system 430B or the local control system for the flight staging area.

When the central control system 430A and/or regional control system 430B determines it is time to further progress one or more AGV1s 40 and respective onboard bags 38 in the loading process, the control systems 430A and/or 430B can send data signals to one or more AGV1s 40 respectively assigning a next destination for the AGV1s 40, for example flight staging lanes 56. The signaled, released and/or assigned AGV1s 40 can then be signaled and autonomously propelled and guided to the next destination.

Flight Staging Lanes

Once bags 38 clear security screening, or have received a new assigned destination from the flight holding area, the respective AGV1 40 with onboard tray and bag 38 can be autonomously propelled and guided to one of the sorting paths of travel 50 as shown in FIG. 2A. Depending on the destination received from the central control system 430A and/or regional control system 430B, each AGV1 40 can automatically and autonomously be propelled and guided to the appropriate sorting path of travel 50 toward the assigned flight staging lane 56, for example by flight number. In one example, the flight staging lanes are actively assigned or designated by the central control system 430A and/or the regional control system 430B based on one or more metrics, for example flight schedule, accumulation of sufficient AGV1s in the flight holding area, and other metrics based on data received by the central control system 430A and/or the regional control system 430B.

For example, the assigned lane 56 positioned far away from the scanning area 46, AGV1 40 can be autonomously propelled and guided to a sorting path of travel 50 toward the bottom of FIG. 2A to avoid "traffic" with other AGV1s 40 that have flight staging lanes 56 closer to the scanning area 46 (and traveling on paths 50 closer to the flight staging lanes 56). Alternately, a sorting path 50, for example positioned at the bottom of FIG. 2A, can be assigned to avoid "traffic" for an express bag lane for rapid/express processing to the assigned make-up module 60.

In one example, the AGV1s 40 can use onboard navigation and anti-collision devices, for example sensors 442 in communication with the onboard control system 430D of the AGV1, and drive actuators 440 to sequentially and efficiently position the AGV1s 40 traveling along sorting paths of travel 50 at any given time. Alternately, or in combination, the AGV1s 40 can receive data signals from the central control system 430A and/or regional control system 430B including instructions for travel speed and navigation control. It is understood that alternate sorting paths of travel 50, in fewer or greater numbers of paths, configurations, orientations, and lengths can be used.

With reference FIGS. 2A and 3 (showing several lanes 56), through receipt of data signals for a location/destination assignment from the central control system 430A and/or regional control system 430B when the AGV1 40 and onboard bag 38 reach the assigned flight staging lane 56, for example by flight number, the AGV1 40 can automatically turn into, and pass through, an entrance end 130 of the assigned flight staging lane 56.

As shown in FIG. 3, each flight staging lane 56 can include a first row 134 and a parallel second row 136, each row wide enough for adequate movement of the AGV1s 40 (including the control system 430D) through the row, but narrow to conserve first level 26 floor space. An express lane 56A can be positioned between two adjacent lanes 56. Express lane 56A can be selectively used by the system 10 (or central control system 430A and/or regional control system 430B) to expedite processing of selected AGV1s 40 with onboard bag 38, for example, a late arriving bag, a bag recalled by security, or a bag that needs to be recalled due to a last minute passenger cancelation. Each flight staging lane 56 and/or express lane 56A can be alternately configured internally to include more rows or less rows, for example a single row. The lanes 56, 56A, and each individual lane 56, 56A can be of different widths, lengths, configurations and/or orientations to accommodate bags 38 and AGV1s 40 of different size, to suit the particular application.

In one example, AGV1s 40 carrying a respective bag 38, or a smaller bag 38A (collective referred to as bag 38) can be automatically sequentially (one after another) positioned and aligned in an assigned flight staging lane 56 as generally shown in FIG. 3.

Once the first or lead AGV1 with onboard bag 38 for a particular flight reaches an exit end 140 of its respective flight staging lane 56, the AGV1 can stop forward motion. One or more sensors on the AGV1 can be used to detect a proximate AGV1 40 stopped in lane 56 to achieve a tightly-packed, space-efficient sequence of AGV1s 40 in flight staging lane 56 to minimize use of floor space. Subsequent AGV1s 40 designated for that same flight sequentially position in the lane 56 stop forward motion on achieving a predetermined distance from a stopped downstream AGV1. In an alternate example, the AGV1s 40 are propelled, positioned and stopped through receipt of data signals from the central control system 430A and/or regional control system 430B.

Further Sorting of Bags in Flight Staging Lanes

Still referring to the example in FIG. 3, further sorting of the queued bags 38 designated for a specific flight can take place in flight staging lanes 56. For example, AGV1s 40 with large or heavy bags may be assigned and propelled to be first positioned or sequenced in a flight staging lane 56 so they are loaded into a container first ahead of smaller or lighter bags. In another example, where the lane 56 is sufficiently wide, for example having a first row 134 and second row 136, the sequenced AGV1s in a lane 56 can be assigned a new destination and propelled in the manner described to take a different position in row 134 or 136, or a sequence in line in a particular row with respect to the other AGV1s to achieve further or preferred sorting. In one example, the AGV1s 40 are capable of lateral, or close to lateral, movement for ease and flexibility in positioning the AGV1s 40 relative to other AGV1s 40 and stationary structures.

This further sorting within flight staging lanes 56 can be based on bag specifics metric, for example size, weight or the type of bag being transported by each AGV1. These bag metrics can be identified, determined, registered and sent to the central control system 430A and/or regional control system 430B when the bags were received in the check-in area 34 or prior to deposit on the AGV1s 40. Other bag specific metrics can be used to further sort the bags within the particular flight staging lane 56. As noted above, the flight staging lanes 56 can be positioned in the enclosed, environmentally-controlled facility first level 26. The ability of the system 10 to further sort bags subsequent to sortation by flight number, is an improvement over conventional bag sorting processes and further useful for the make-up module 60 and associated processes described herein.

Although the above described flight staging lanes 56 can be identified or assigned based on flight number, each lane 56 can alternately be designated or assigned by other metrics received by the central control system 430A and/or regional control system 430B. For example, bag lane 56 may be assigned, or assignment further aided or narrowed by bag size and/or weight, passenger class of service, passenger rewards program status, bags requiring a transfer at a destination airport, downline station (for complex transfers), and/or make-up module, storage area, or other metric suitable for the system 10.

In applications other than airports and passenger bags, the alternate metrics used to assign one or more lanes equivalent to lanes 56 can be determined by a central control system and/or local control system as generally described and the AGV1s 40 and onboard package or parcel can be guided to the predetermined sorting area (alternate bag lane 56) in a similar manner as descried above. For example, where an application of the system 10 can be a parcel or cargo distribution center, a parcel staging lane can be designated by truck, train, bus or ship number, destination, shipping dock, holding area, or other metrics suitable for the application.

In another example, one or more conventional belt conveyors can be used along either or both of the sorting paths 50 and/or flight staging lanes 56 instead of exclusive use of AGV1s 40 as described. Alternate devices and process in for transferring, sorting and positioning bags 38 prior to loading bags in the make-up modules 60 described further below can be used.

The transfer, sorting and staging/queuing of bags 38 by flight number (or other metric) through the devices and methods described are each significant improvements over conventional devices and methods. The described transfer, sorting and queuing of bags 38 as described provides significant flexibility in the overall process. For example, there is significant process flexibility in the use of autonomous AGV1s 40 and assigned flight holding areas and flight staging lanes 56 by flight number (or other metric as described). For example, for large flights, multiple flight staging lanes 56 can be quickly and easily assigned by the central control system 430A and/or regional control system 430B for that flight to accommodate a large number of passengers or unusually high numbers of checked bags for the flight. Alternately, if a flight staging lane 56 becomes inoperative or impassable, an alternate lane 56 can easily be designated or assigned by the central control system 430A and/or regional control system 430B. In this instance, the AGV1s already in route from the screening area 46 or flight holding area can be signaled "on the fly" by the central control system 430A and/or regional control system 430B to travel to the newly assigned flight staging lane 56. In the event of a security lockdown incident, all AGV1s could be signaled to stop advancement and/or be assigned a new destination to travel to a secure area or sequestered for further inspection.

Further, the described transfer, sorting and queuing of bags 38 provides for a more efficient system over conventional devices and methods requiring temporary holding or storage areas while the bags waited to be sorted. By sorting and sequentially ordering the bags 38 in the flight holding area by flight number or approximate time of departure, and selectively releasing and advancing the bags 38 into the flight staging lanes 56 and then on to the make-up modules 60 to be loaded into the containers, the system 10 provides "just in time" type of transfer and delivery of bags 38 for loading into containers 80 and transport to a flight gate for loading onto an airplane (or other vehicle).

Still referring to the FIG. 3, in one example, the AGV1s 40 can continue to gather and queue in the predetermined flight staging lane 56 until a predetermined number of bags sufficient to completely fill a container 80 suitable for that particular flight is achieved. For example, if the flight number is for a wide body jet, containers in the form of unit load devices (ULDs) can be used (described further below). In example embodiments, ULDs can hold an average number of 36 bags 38. In one example, when the predetermined number of bags 38 accumulate in a respective flight staging lane 56, the AGV1s 40 are automatically and sequentially activated to begin sequentially advancing into an assigned make-up module 60. The determination of the number of queued bags in a lane 56 can be determined by a machine vision system including one or more cameras that are in communication with the central control system 430A and/or regional control system 430B, where the control systems 430A and/or 430B can use image processing techniques for identifying the number of AGV1s 40 that are waiting in the staging lane 56. In one example, in response to detecting that a sufficient number of AGV1s 40 with respective onboard bag 38 to fill 1.5 to 2 containers 80 are waiting in a staging lane 56, the central control system 430A and/or regional control system 430B can signal or release the particular AGV1s 40 to instruct the identified AGV1s 40 to autonomously move from the staging lane(s) 56 to a make-up module 60 that has been assigned to the identified AGV1s 40.

In one example, the central control system 430A and/or regional control system 430B can include a tracking model program and/or software stored (e.g., in memory 434 and executed by processor 432) that is in communication with one or more sensors 442 to detect and/or otherwise logistically track the location of each of the AGV1s 40 with respective onboard bag 38, for example in the staging lanes 56. In one example, the tracking model can determine the number of AGV1s 40 with onboard bag 38 positioned in a staging lane 56, and at what time to release certain of the AGV1s 40 from a staging lane(s) 56 to the make-up module 60 in a manner described herein. Other devices and/or methods may be used as known by those skilled in the art.

With reference to FIGS. 2A and 3, in response to receipt of data signals from central control system 430A and/or regional control system 430B s of a next destination assignment to the make-up module 60 (discussed further below), the AGV1s are automatically and autonomously propelled and guided to an assigned make-up module along guide path 144. In one example, each lane 56 may be assigned a predetermined make-up module or modules 60 whereby all bags from a particular lane 56 are routed. In another example, the assigned make-up module is assigned by flight number. Alternately, another metric may determine the assigned make-up module 60.

In one example of movement of AGV1s 40 from the staging lanes 56 into an assigned make-up module 60, the AGV1s 40 may be directed to move, in a sequence or order different than a particular AGV1's 40 position or sequence in lane 56. For example in FIG. 3, AGV1 40B and/or 40C may be signaled to move to the assigned make-up module 60 prior to signaling AGV1 40A sequenced in front of 40B and 40C. By not having hard or stationary barriers to define lanes 56, the AGV1s 40 preferably have space to move out of line and progress toward the next assigned destination. This is equally useful if a bag 38 being transported by an AGV1 is recalled by security, a bag already positioned in lane 56 needs to be expedited through the process, or a passenger cancels a flight.

In an alternate example, the central control system 430A and/or regional control system 430B can receive a signal from a make-up module control system which requests or instructs a certain number of queued AGV1s in a particular flight staging lane 56 to release or send a predetermined number of AGV1s, for example two, toward a particular assigned make-up module 60 for loading. In this example, the central control system 430A and/or regional control system 430B can send data signals to, for example, the first two sequential AGV1s queued in a particular lane 56, and autonomously propel and guide those two AGV1s toward the assigned make-up module 60. Other numbers of AGV1s, and other metrics used to request or release AGV1s from flight staging lanes 56 to the make-up modules may be used as known by those skilled in the art.

The ability to direct each AGV1 40 to an assigned make-up module 60 provides increased flexibility and efficiency in the process. For example, if a particular make-up module 60 becomes inoperative, AGV1s exiting flight staging lanes 56 can simply be signaled by the central control system 430A and/or regional control system 430B and assigned a new destination to an alternate make-up module 60 to maintain that flight's bag make-up operations. In another example, if a large number of bags 38 are queued in a bag lane 56, multiple make-up modules 60 may be assigned, and AGV1s guided, to increase bag throughput into containers and transfer to the respective aircraft stand. Other devices and methods used to assign make-up modules and to transfer the AGV1s from the flight staging lanes 56 to the make-up modules 60 known by those skilled in the art may be used.

Make-Up Modules

Referring to FIGS. 1, 3 and 5-7, examples of make-up modules or areas 60 useful in an exemplary embodiment of the system 10 are shown. Make-up modules 60 can be positioned in close proximity, side-by-side parallel orientation, on the first level 26 adjacent to flight staging lanes 56. Referring to FIG. 3, each make-up module 60 can include an entrance end 150 positioned adjacent to the array of lanes 56.

Figure 5:
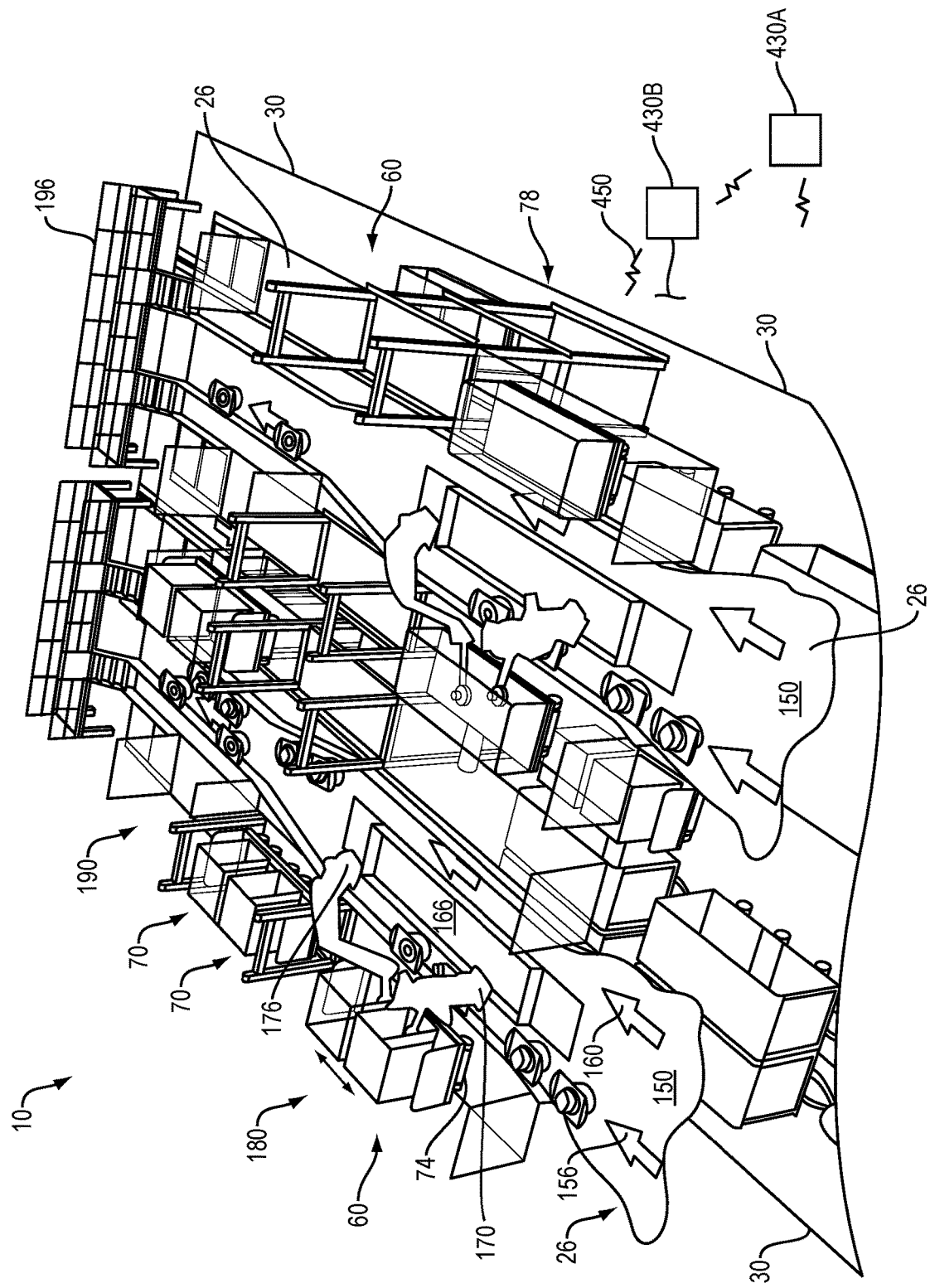
FIG. 5 is a schematic front perspective view of one example of a make-up module according to embodiments of the present disclosure.
Figure 6:
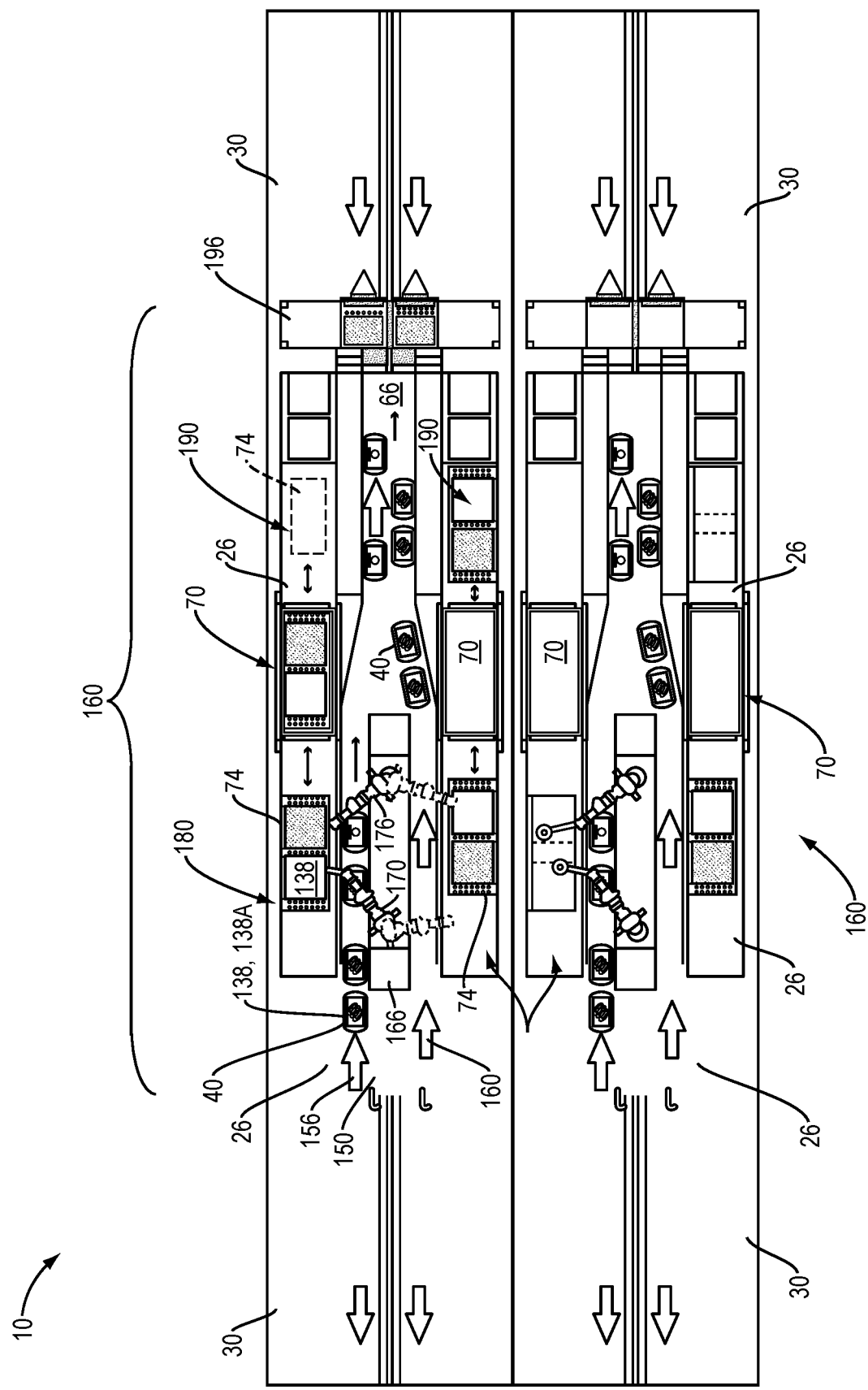
FIG. 6 is a top view of the example shown in FIG. 5.

Referring to FIGS. 3, 5 and 6, exemplary make-up modules 60 each include a first lane 156 and a second lane 160 which diverge to opposing sides of a center support 166. Each first 156 and second 160 lane is sized and configured to allow AGV1s 40 to easily travel through the make-up module 60 while minimizing the use of floor space. In an alternate example, only a first or single lane is used as a path of travel for the AGV1s through the make-up module 60.

In one example of system 10, the automated equipment and process described with reference to make-up modules 60 can be controlled by a local make-up module control system 430C in communication with the central control system 430A and/or regional control system 430B. Exemplary hardware and software of the make-up module control system are described above for central control system 430A and/or regional control system 430B and generally illustrated in FIG. 14. Local control system 430C is in communication with the other control systems described herein, (e.g., control system 430A, 430B, 430D). Alternate control systems known by those skilled in the art and suitable for the application and specification requirements may be used.

Automated Load Cell, Robot Loaders and End Effectors

With reference to FIGS. 5 and 6, each make-up module 60 can include a pair of automated load cells 180, one positioned on each opposing side of the first 156 and second 160 lanes. Automated load cells 180 can be positioned laterally adjacent to the center support 166 within reach of each of the exemplary first robot 170 and second robot 176. Through use of onboard robot sensors and/or other vision detection system devices, the robots 170, 176 can be operable to engage, for example grasping, through suction, or scooping, each bag 38; remove the bag from the AGV1 40; transfer the bag to a container 80 positioned in either of the automated load cells 180, and disengage the bag to deposit the bag in the container 80. As further described below, the first robot 170 and second robot 176 can automatically remove bags 38 from the AGV1s 40 that are temporarily stopped adjacent the automated load cell 180 and load the bags into containers 80 supported by respective second automated guided vehicles (AGV2s) 74.

In a preferred example, first robot 170 and second robot 176 are mounted to the center support 166. Each of the first robot 170 and second robot 176 can be industrial, multi-axis, programmable robots suitable to grasp or otherwise engage, lift, transfer, and deposit bags 38, from the AGV1s 40 into containers 80 as described herein. Each exemplary robot 170, 176 can be in communication with a dedicated robot control system (see for example the components of FIG. 14) which is in communication with central control system 430A, regional control system 430B, or a local control system for the automated load cells. Other fully-automated, or semi-automated, devices may be used to engage, move and release bags 38. In one example, robots 170, 176 can each include one or more sensors and an end effector capable of engaging bags 38 of varying sizes, shapes and weights.

In an alternate example, four (4) robots can be utilized and mounted to each center support 166. In the example, the four robots can work independently of each other or, for example, can work in pairs to compliment the function of the other. For example, one cooperating robot can engage and lift the bag from the AGV1 40 with one type of end effector and deposit the bag on the end effector of the cooperating robot. For example, the grasping and lifting robot end effector can include a vacuum or suction end effector and the cooperating robot end effector can include a horizontal platform or tray to which the bag is placed upon and disengaged. The platform end effector may be more suitable for navigating the supported bag and positioning the bag inside container 80, for example a ULD 360. In one example, the above exemplary end effector with the platform can include a small conveyor which is selectively activated to propel the bag from the end effector into the container. In an alternate example, the horizontal end effector may include two side-by-side, independently movable conveyors useful for more flexibility to reorient the supported bag to fit in open spaces in the container. Other numbers of robots, different types of end effectors, and coordinated operation between the robots.

In the two robot example shown, each robot can fixedly or dynamically connected to center support 166 and is capable of reaching to the full extent of any container 80 interior cavity positioned in either of the automated load cells 180. In an alternate example, one or both of the robots 170, 176 may be connected to a movable base structure (not shown) which allows readily changing the position of the robot relative to the automated load cells 180. In another example, each robot 170, 176 can be mounted to an automated guided vehicle which can allow autonomous, or semi-autonomous adjustment of the position of the robot based on one or more conditions. For example, sensors on the robot indicate a bag to be engaged or deposited in container 80 is beyond the reach of the robot at its current position.

In one example of operation, both robots 170, 176 individually, or cooperatively, work on one side, a particular automated load cell 180 until the container 80 is full, or to a predetermined level. The robots 170, 176 then rotate to fill a container 80 in the opposing automated load cell 180 in a similar manner. Alternate operation and processing of the robots 170, 176 to suit the application and performance standards to obtain maximum use and efficiency of robots 170, 176.

Manual Load Cell

Each make-up module 60 can include a pair of manual load cells 190, each manual load cell 190 can be positioned on an opposing side of the first lane 156 and second lane 160. Each manual load cell 190 can also be positioned on an opposing side of elevator 70 from the automated load cell 180 on the same side of either first lane 156 or second lane 160. One advantage of the manual load cell positioning is that bag handlers can be distanced from the automated machinery, for example robots 170, 176 in the automated load areas 180.

Manual load cells 190 can be useful for human handlers to manually load bags 38 into containers 80 that are not suitable for loading by the robots (or other automated loading devices) in the automated load cells 180. Manual assist devices can be included to provide a mechanical advantage for the handlers. Alternately, the manual load cells 190 may be used where a container 80 cannot be filled to capacity, or another condition exists which prevents a bag from not being loaded into a container 80, in the automated load cells 180. AGV2s 74 can freely move between the automated load cell 180 and the manual load cell 190 on a respective side of first lane 156 or second lane 160.

Referring to FIGS. 5 and 7, exemplary make-up module 60 includes an observation area 196 where supervisors or bag handlers can monitor the operation of make-up module 60 and/or access the automated 180 or manual 190 load cells without having to enter the pathways of the AGV1s 40 through the make-up module 60. Observation area 196 may also serve as locations to house, for example, robot 170, 176 control system cabinets and other equipment (not shown) away from pathways of the AGV1s 40, AGV2s 74, elevators 70, and the robots 170, 176.

Elevators

Figure 8:
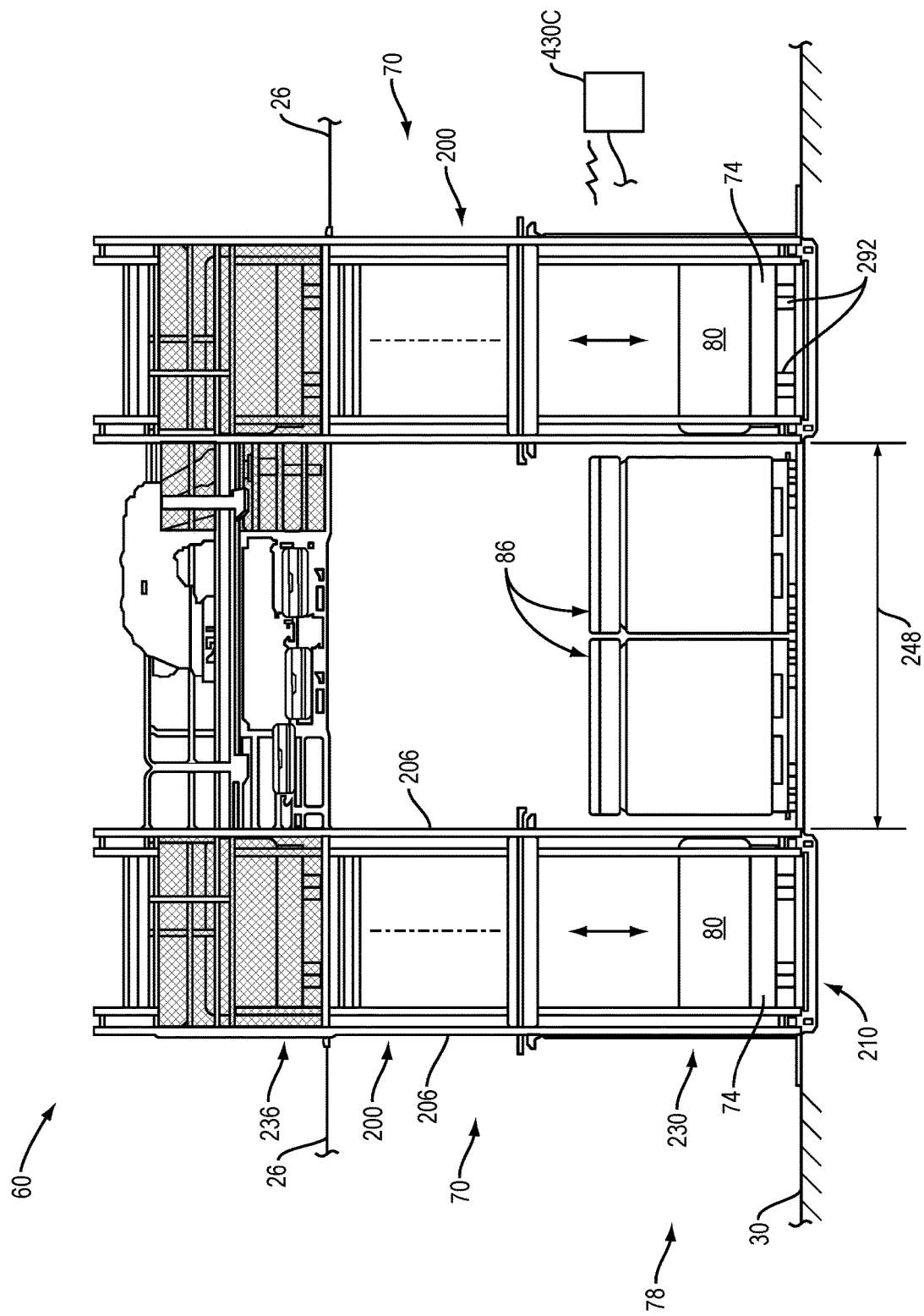
FIG. 8 is a right side end view of FIG. 7.

With reference to FIG. 7, in one example embodiment of system 10, each exemplary make-up module 60 can include a pair of elevators 70. As shown, each elevator 70 can be positioned on one side of either first lane 156 or second lane 160 between respective automated load cell 180 and manual load cell 190. Each exemplary elevator 70 can include a frame 200 secured to second/ramp level 30 with posts 206 extending vertically upward through first level 26 as generally shown. As shown in FIGS. 7 and 8, a support platform 210 is connected to the frame and selectively moves from a first (e.g., lowered) position 230 substantially flush or planar with second/ramp level 30, to a second (e.g., upper) position 236 wherein the platform 210 is flush or planar with the first level 26.

The platform 210 is sized and configured to receive and support AGV2 74 and an onboard container 80 as described herein. Frame 200 and posts 206 are sized and configured to define an entrance end 214 and an opposing exit end 220 of suitable size to permit the passage of AGV2 74 and onboard container to enter and exit the elevator 70 on both the first level 26 and the second/ramp level 30 as shown in FIG. 7 and described herein.

Elevator 70 further includes a lifting device connected to the support platform 210 and is operable to selectively raise and lower the support platform 210 between the lower 230 and upper 236 positions. The lifting device can include a control system (see for example the components in FIG. 14) for monitoring the position and selectively moving the support platform 210. The elevator control system can be in communication with the central control system 430A, regional control system 430B, a local control system for the make-up module 60, and a control system for the transfer cell. The make-up control system monitors the position and controls movement of platform 210. In one example, the lifting device includes one or more electric motors engaged with cables and pullies connected to support platform 210. In an alternate example, one or more hydraulic motors and hoses are used. As described herein, one or more angled ramps positioned between the level 30 and first level 26 may alternately be used. Other forms of lifting devices and control systems for elevators 70 can be used.

Example Operation of Elevator

In one example of operation of elevator 70 in make-up module 60, one of the AGV2s 74 supporting an empty container 80 can be automatically and autonomously propelled and guided through the elevator entry 214 onto platform 210 in the lowered position 230 as shown in FIG. 7. One or more sensors 442 on the frame 200 and/or platform 210 may be used to detect the presence and position of the AGV2 74 on platform 210. In one example, one or more sensors may be used to scan or otherwise detect an identification number or indicia on the container 80. For example, a ULD belonging to one airline, should not be raised into a make-up module 60 this has been assigned to load bags 38 for a different airline.

Platform 210 is automatically raised from the lower position 230 to the upper position 236. Once determined, for example through sensors 442, that the platform 210 is at the upper position 236, AGV2 74 automatically and autonomously is propelled and guided off of the platform 210 to either the automated load cell 180 or the manual load cell 190. In one example, a first AGV2 74 is first routed off the elevator to the automated load cell 180. While the first AGV2 is positioned in automated load cell 180, platform 210 remains in the second upper position 136. If the container positioned in the automated load cell 180 requires manual loading of some bags 38, the AGV2 74 can move the partially filled container from the automated load cell 180, over the stationary platform 210 to the manual load cell 190 to complete filling of the bags as described below. In this instance while the AGV2 is positioned in the manual load cell, 190, the platform 210 will move to the first or lower position 230 to receive a second AGV2 74 with an empty container 80 for delivery to the automated load cell 180 in the manner described.

In one example, if the containers 80 are able to be completely filled with bags 38, or filled to a predetermine amount, in the automated load cell 180 each of the first and second loaded AGV2 74 and respective container 80 are separately, independently, and autonomously propelled and guided back onto platform 210 located at the upper position 236, and then lowered to the lowered position 230. On determining, for example through sensors (not shown) that the AGV2 and loaded container is positioned at the lower position 230, the AGV2 74 and loaded container 80 is automatically and autonomously propelled off of the platform 210 through transfer cell exit end 220. The platform 210 is then raised back to the upper position 236 wherein the second AGV2 and loaded container is received and then returned to the lowered position and exited from the platform 210 in a similar manner as described. Other and alternate sequences of movement of the platform 210 may be used to suit the particular bag loading condition and/or status of the make-up module 60 and/or transfer cell 78.

Example Operation of Make-Up Module

In an example of operation of exemplary make-up module 60 at the beginning of a shift, or activation of make-up module 60 for use, two AGV2s 74 with empty containers 80 are positioned in a make-up module or area 60, one AGV2 74 and empty container 80 in each of the pair of automated load cells 180. As described above and referring to FIGS. 5 and 6, AGV1s 40 with onboard bag(s) 38 are selectively and autonomously propelled, and sequentially guided, into the make-up module 60 on one of the first lane 156 or second lane 160.

If the AGV1 40 onboard bag 38 is suitable for loading by one of the robots 170, 176 as determined by the central control system 430A based on one or more previously identified and recorded bag metrics described above, the AGV1 40 will receive a data signal destination assignment from the central control system 430A and/or regional control system 430B to temporarily stop forward advancement in an area directly adjacent the automated loading cell 180. In one example, module control system 430C can determine if the AGV1 and onboard bags are suitable for automated loading based on previously identified and registered specific bag metrics. Alternately, or in addition, sensing devices on the robot end effectors can scan and/or otherwise detect, whether the bag 38 onboard the AGV1 40 is suitable for automated loading as well as orientation of the bag 38 relative to the AGV1 40 in order to adjust and securely engage the bag 38 for loading into container 80. Other devices and methods to determine whether and where an AGV1 40 and onboard bag can stop and be loaded through automated devices or by manual efforts can be used.

In one example, while the AGV1 40 is stopped adjacent the automated loading cell 180, the first 170 and the second 176 individually, or cooperatively work to engage each bag 38, remove the bags from the AGV1 40, position the bags in a suitable position in the interior cavity of one of the container 80 positioned in the automated load cell 180, and deposit the bags in the container 80. Once the container 80 is filled, or filled to a predetermined amount, the robots 170, 176 can rotate to the opposing automated load cell 180 to fill the container in the same manner. Other sequences of operation of the robots 170, 176 can be used.

In one example, where it is determined that a predesignated bag for automated loading (or other condition) positioned in the automated load cell 180 cannot be loaded through automated means, make-up module 60 can include a fault parking area positioned away from the AGV1s paths of travel through the automated load cell 180 so as to not block or impede subsequent passage of AGV1s. In the example, if the above fault occurs, the make-up module control system 430C can signal the central control system 430A and/or regional control system 430B to send a new destination assignment so as to propel and guide the AGV1 carrying the unloadable bag to the fault parking area where further processes can be taken to cure the fault and/or load the bag. In one example, when the make-up module 60 transitions to a manual loading operation in the manual load cell 190, the module control system 430C can assign the AGV1 in the fault park area to move to the manual load cell 190 to remove and load the bag into a container 80.

Automated Load Cell Loads Container to 100% Capacity

In one example operation of make-up module 60, both of the containers 80 positioned in the opposing automated load cells 180 are able to be filed to 100% capacity by the automated robots 170, 176. The determination to what extent that a container 80 is full, or alternately still has available capacity for more bags 38, is determined by one or more sensors or vision systems on the respective robots 170, 176, and/or positioned in make-up module 60. These sensors and/or vision systems are in communication with the control systems for the robot 170, 176, the local for the make-up module 60, central control system 430A, and/or regional control system 430B to continue bag loading cycles by the robots 170, 176 until the containers 80 positioned in the automated loading cell are full to capacity, or predetermined capacity. Alternately, the control systems for the robot 170, 176, the local for the make-up module 60, central control system 430A, and/or regional control system 430B can direct the robots 170, 176 to remain idle until it is determined that one or both of the automated load cells 180 include and an empty container 80 to begin bag loading cycles.

As described above, when a container positioned in an automated load cell 180 is determined to be full, the AGV2 74 can be signaled to move in the manner described to the elevator platform 210 and returned to the transfer cell 78 for further processing.

Automated Load Cell and Manual Load Cell Used to Fill to 100% Capacity

In an alternate example, one or both of the containers 80 positioned in the automated load cells 180 can be filed to, for example 80% capacity, by the robots 170, 176. In this instance, in one example, the AGV2s 74 with the partially-filled containers 80 are automatically, autonomously and independently respectively propelled and guided from the automated load cell 180 to the manual load cell 190. Human bag handlers will then manually remove bags 38 from AGV1s 40 having bags not suitable for automated loading that have temporarily stopped forward advancement adjacent the manual load cells 190, and fill the container 80 to 100% full bag capacity. In one example, once a container 80 is filled to capacity, or a predetermined amount, an input to the make-up module control system may be used to signal loading of the bags in the automated load cell is complete. In one example, an operator may manually push a control button which signals the control system for the make-up module, central control system 430A, and/or regional control system 430B that the load operation is complete. The make-up module control system can then send a data signal to the AGV2 74 with filled container 80 with a next assignment destination and instructions to be autonomously propelled and guided back to elevator 70 for position on platform 210, or other assigned destination in the manner described herein. Platform 210 is automatically returned to the first/lower position 230 and autonomously exited from the elevator through exit end 230. The process repeats for the second AGV2 with filled container 80. Other devices and/or processes to signal that loading of a container is complete in the automated load cell 180 (or manual load cell discussed below) and re-initiate movement of the AGV2 to a next assigned destination can be used.

Manual Load Station Fill Only

In one example, where there are sufficient bags 38 to fill a container 80 that are required to be manually loaded, an AGV2 74 and empty container positioned in the manual load cell 190 can be manually filled. The full-to-capacity AGV2 74 is then propelled and guided to the elevator 70 for return to the ramp level 30 as similarly described herein. In the example described above for automated load cell 180, a manual input (push button) may be used to signal the make-up module control system the manual load operation is complete and a data signal to the AGV2 is sent to propel and guide the AGV2 back to the elevator or other assigned destination in the manner described.

Although the above AGV2 74 with onboard full or empty containers are described as independently moving between load cells 180, 190 and elevators 70, it is understood that a fixed time schedule may be implemented for each loading and moving action. For example, a fixed time may be set for an AGV2 74 to be positioned at the automated load cell 180 and be filled with bags. If the container 80 is filled to capacity prior to the end of the predetermined time period for that action, the AGV2 74 with full container 80 may remain idle until the time period ends and then is propelled to the elevator 70 as generally described above. In one example, predetermined time limits may be established for each AGV1 40 and AGV2 74 movements throughout system 10.

As shown in FIG. 7 (one load cell 60 shown), and FIGS. 5 and 6 (two make-up modules 60 shown side-by-side), exemplary make-up module 60 can include two elevators 70, one positioned on opposing sides of the first lane 156 and second lane 160. It is understood that make-up module 60 may take different configurations. For example, only a first lane 156 may be used with a single automated load cell 180, single elevator 70, single manual load cell 190, and/or a first robot 170. Alternately, more than two automated load cells 180, two elevators 70, two manual load cells 190, and/or more than two robots 170, 176 may be used. Further, the position and spatial relationships between the automated load cell 180, elevator 70, manual load cell 190, and the robots 170, 176 relative to each other and make-up module 60 may be different than shown to suit the particular application and performance requirements. In one example, a make-up module 60 may include four (4) elevators 70, two on each opposing side of first lane 156 and second lane 160.

The above illustrated and described system 10 examples including flight staging lanes 56 and make-up module 60, which result in fully-loaded, or nearly fully-loaded, containers 80 that are sorted by specific flight, can be completed on the first level 26 inside an environmentally controlled facility. Further, a substantial amount of the loading of bags 38 can be conducted by automated devices (robots 170, 176). Further, where necessary to use manual efforts to fill containers 80 to full capacity, system 10 and make-up modules 60 provide an integrated manual load cell 190 in easy communication with the elevator(s) 70. Each of these bag loading devices and processes is a significant improvement over conventional bag handling systems and processes.

Make-Up Module Fault Conditions and Redundancies

In one example embodiment of system 10, and make-up module 60, one or more redundancy processes or procedures can be implemented in the event of, for example, equipment failure or other fault.

As shown in FIG. 6, in the example of a make-up module having two robots 170,176 in an automated load cell 180, in the event that one robot 170, 176 becomes disabled, for example robot 170, the AGV2 74 positioned in that automated load cell 180 can be directed or assigned to adjust its position. In one example, if robot 170 becomes disabled, robot 176 may not include the reach capability for the container 80 interior that was to be serviced by robot 170. In this instance of a fault of robot 170, the make-up module control system 430C may be signaled of the robot fault and direct or assign the AGV2 74 positioned in the affected automated load cell 180 to laterally move or shift position to a position where the full container 80 interior can be reached by active robot 176 to fill the container will bags 38 as described herein.

In one example of a fault or disablement of an AGV1 40 or an AGV2 74, the module control system 430C can be signaled that a particular AGV1 40 or AGV2 74 is in a fault state or disabled. In one example, if the AGV1/AGV2 still has mobility function, a local operator or module supervisor can with a teach pendant, or other device, establish a communication link with the control system onboard the AGV, the control system for the make-up module 60, central control system 430A, and/or regional control system 430B and manually guide the disabled AGV to an area, for example the fault park area described above. In another example, if the AGV has lost mobility, the AGV can be physically removed from the area. When a fault condition occurs, the central control system 430A, regional control system 430B, and/or control system 430C for the make-up module 60 can be signaled and appropriate signals can be sent to the respective AGV1/AGV2 to, for example, instruct AGV1/AGV2 to stop forward movement until the fault condition is remedied. Other methods and processed to assist with a fault condition in module 60 can be implemented.

In one example of a fault or disablement with an elevator 70, AGV2s 74 positioned in an automated 180 or manual 190 load cell can be redirected to another elevator 70. As shown in FIGS. 5 and 6, if one of the two elevators in a make-up module 60 becomes disabled/inoperative, the module control system 430C can be signaled with the fault condition of the elevator. In one example, the module control system 430C can assign one or both of the AGV2s 74 positioned on that side of the module 60 (one in the automated load cell 180 and/or in the manual load cell 190), through data signals described herein, to travel to an alternate elevator to return to the ramp level 30. In one example, the AGV2s 74 will be directed to an elevator in an adjacent make-up module 60. Alternately, the AGV2s 74 can be directed to the other elevator 70 in the same make-up module. In one example, AGV2s include omni-directional movement and can move laterally. Alternately, the AGV2s can first rotate and then move in a lateral direction.

Once returned to the ramp level 30, the AGV2s 74 can be directed/assigned to a new destination which returns the AGV2s to the proper transfer cell 78 of the disabled elevator. Other methods and movements of the AGV2s may be used to suit the particular fault condition as known by those skilled in the art.

Battery Charging Station

Figure 6A:
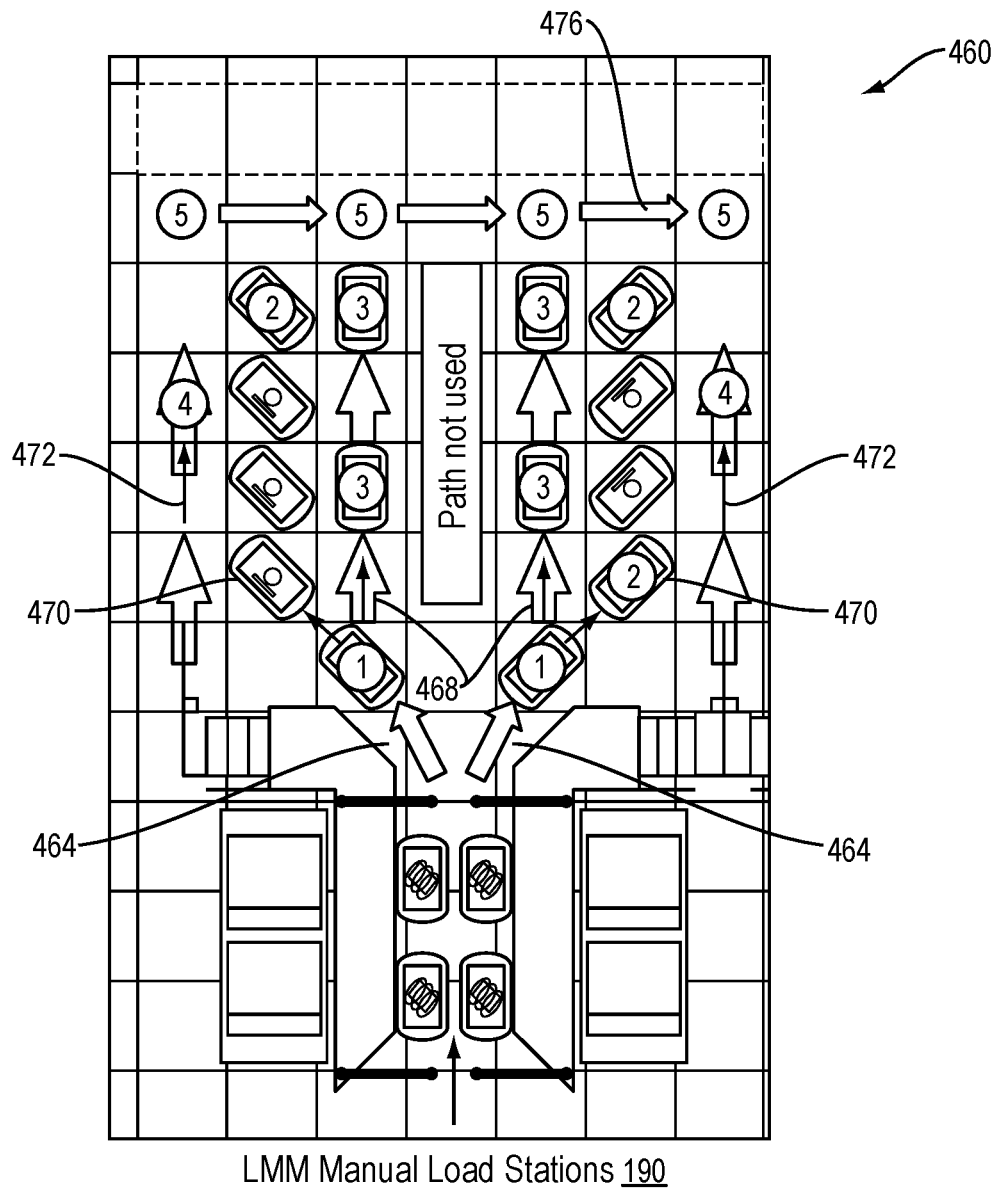
FIG. 6A is a schematic of an exemplary automated ground vehicle battery charging station according to embodiments of the present disclosure.

Referring to FIG. 6A, in one example of system 10, make-up module 60 further includes an AGV1 battery charging/replacing station 460 as generally shown. In the example, charging station 460 is positioned downstream of, in communication with, the make-up module manual load station 190. Exemplary charging station 460 includes angularly diverging paths 464 each in communication with a respective lanes 468 and a plurality of charging spots 470 (four spots shown for each lane 468). In one example of operation, empty AGV1s exiting past the manual load stations 190 will be poled or queried for its present battery charge level or status by the control system 430C for the make-up module 60, central control system 430A, or regional control system 430B. This can be done through sensors and wireless signal transfer as known by those skilled in the art.

If the reported or otherwise detected battery charge level is sufficient for another bag carrying cycle in system 10, the AGV1 40 is signaled and assigned a new destination, for example return path 66 (FIG. 1) for another bag 38 induction as described above.

If the detected charge level is below a predetermined level, the AGV1 can be signaled and assigned to enter the charging station 460 by the control system 430C for the make-up module 60, central control system 430A, or regional control system 430B. In one example, AGV1s are assigned a destination by the central control system 430A and/or regional control system 430B to autonomously follow one of the paths 464 to one of the charging spots 470 where the battery of the AGV1 will be engaged and automatically charged. Alternately, the battery can be replaced by a charged battery. On a determination the AGV1 battery has been fully charged, a signal can be sent to the central control system 430A and/or regional control system 430B which can send a data signal and assignment to the charged AGV1 to instruct the AGV1 to exit the charging station 460 along exit lane 476 to a new destination, for example back upstream to receive a bag just processed at check-in area 34. Other battery stations or areas including different charging devices, locations, configurations and paths of travel, for both AGV1s 40 and AGV2s 74, to suit the particular application and performance specifications can be used.

Transfer Cell

Referring to FIGS. 7 and 8, example embodiments of a bag transfer cell 78 positioned at the second/ramp (or ramp) level 30 in system 10 are shown. Exemplary ramp level 30 can be at ramp level which can be the same level as full container staging area 94 and aircraft stand 98 where the planes are docked for loading of bags into the plane baggage hold compartments (see FIG. 4).

Although described that make-up modules 60 are positioned on a first level or floor 26 above ramp/ramp level 30, it is understood that first level 26 can be positioned on a level or floor below the ramp/ramp level 30. In this example, the elevators 70 from the make-up modules 60 can travel upward to deliver full containers to the transfer cell 78. The position of the make-up modules 60 relative to the transfer cell 78 equally apply in the described alternate example where the AGV2s 74 move on angled ramps between the make-up modules 60 and the transfer cells 78.

Exemplary transfer cell 78 includes a local control system in communication with central control system 430A, regional control system 430B, and/or the control system for the make-up module 60. The transfer cell control system can include hardware, operating system and software (suitable for the transfer cell operations described) similar to the control systems described herein and illustrated in FIG. 14. Other control systems and components known to suit the particular application and performance requirements can be used.

In exemplary system 10, ramp level 30 is the ramp floor of a selectively enclosed, environmentally-controlled facility, and directly below first level 26. As shown in FIG. 8, the make-up module(s) 60, and more specifically the elevators 70, can be laterally positioned apart to allow for a delivery cart passageway 248 between the elevator frames 200. In the example shown, passageway 248 is wide enough for two delivery carts 86 to be positioned side-by-side for ease of movement between the frames 200 along the path of travel 92 and further described below. It is understood that cart passageway 248 can be wider or narrower to accommodate fewer or a greater number of delivery carts 86, or other transfer devices, between frames 200 to suit the particular application and bag throughput requirements.

Referring to FIG. 7, system 10 exemplary transfer cell 78 serves to first load empty containers 80 (for example ULDs 360, transfer containers 370 and/or trays 380) onto AGV2s 74 for transfer to respective of the make-up modules 60 for loading of bags 38. On return of AGV2s 74 by elevator 70 with full containers 80, the transfer cell 78 further serves to transfer the full containers 80 back onto delivery carts 86 for transfer to a staging area 94 or aircraft stands 98 for loading into assigned aircraft.

In the example, transfer cell 78 includes a delivery cart 86 entry area 280 positioned upstream of the elevators 70 and a cart exit area 282 positioned downstream of the elevators 70 along the path of travel 92. As shown in FIG. 7, delivery carts 86 supporting empty containers 80 can be brought into position in cart entry area 280. In one example, the delivery carts 86 can be directed to a predetermined transfer cell 78 in communication with a make-up module 60. For example, if a make-up module 60 is assigned to a particular flight by a particular airline, containers 80 suitable for that flight, for example containers 80 owned by a particular airline, and ULDs for the large aircraft for that flight are directed toward the predetermined transfer cell 78 for that predetermined make-up module 60. Other methods and processes for organizing and sequencing suitable containers by airline, flight and other metrics can be used.

In the example shown in FIGS. 7 and 8, the delivery carts 86 carrying empty containers 80 can be oriented in sequential rows of two (2) delivery carts 86 positioned side-by-side as generally shown. In one example, the carts 86 can be selectively connected to a transport vehicle 90 (commonly called tuggers) which pull (or push) one or more delivery carts 86 to desired positions. The transport vehicles may be driven by a human operator or may be autonomous vehicles.

In one example, the AGV2s 74 may need to properly orient the container 80 such that the container 80 open side (to receive bags 38) is positioned to face the robots 170, 176 once positioned in the make-up module. One or more sensors can be used to detect and send a data signal to a local control system of the transfer cell 78 or other of the control systems described herein. The control system of transfer cell 78 can then assign a movement operation to the AGV2 74 to change the orientation, for example rotate 180 degrees, if necessary.

AGV2

Figure 9:
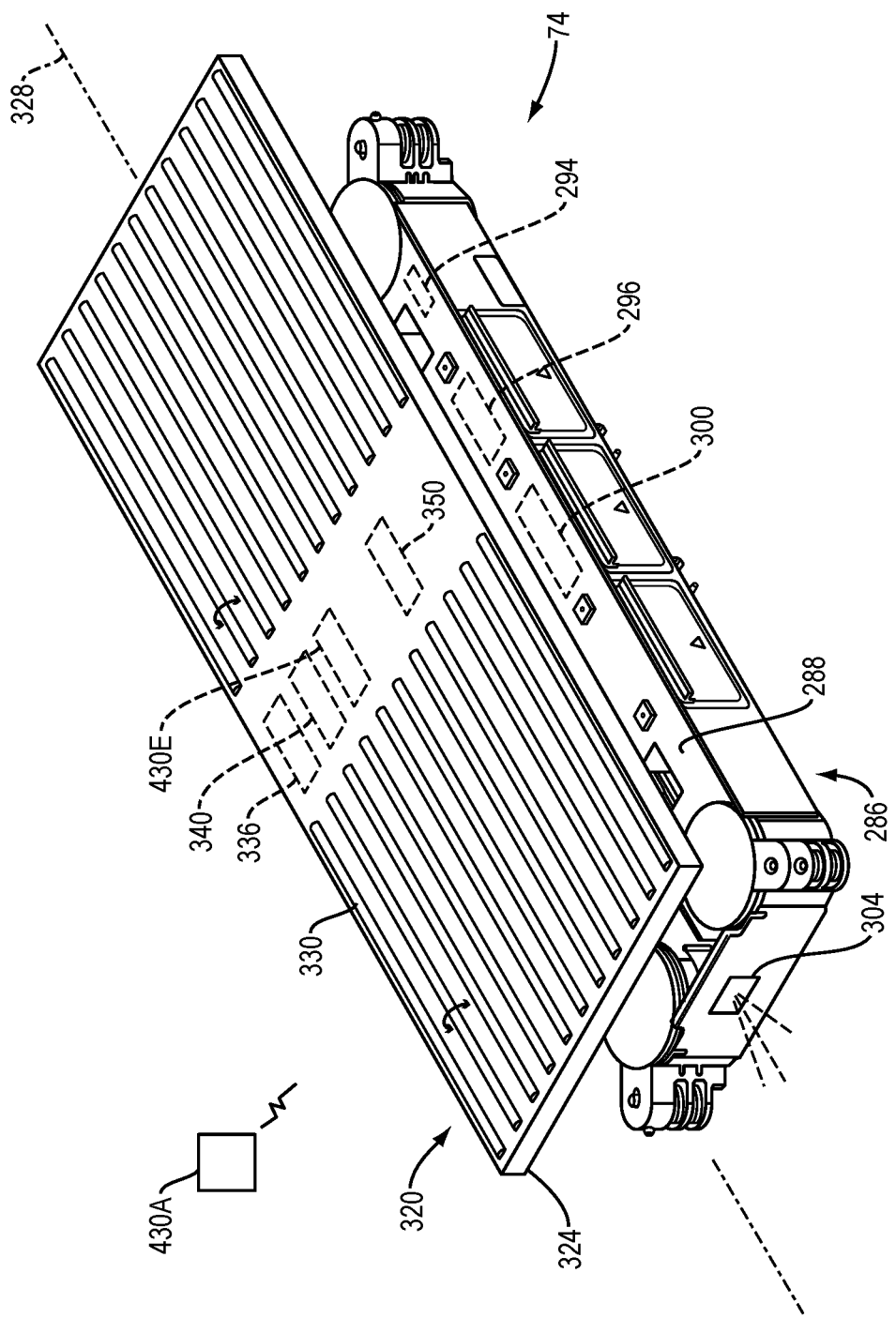
FIG. 9 is a perspective view of an example of an automated guided vehicle according to embodiments of the present disclosure.

Referring to FIGS. 9-13, examples of AGV2 74 and containers 80 are shown. Referring to FIG. 9, an exemplary AGV2 74 is illustrated. As described above, second AGV2 74 serves to transfer empty containers 80 to the make-up modules 60 and return full containers 80 by the elevators 70 to ramp level 30. Exemplary AGV2 74 includes a base 286 having a top surface 288, and wheels 292 to support the base on a hard surface. One or more of the wheels 292 are selectively driven by one or more actuators, for example electric motors, 294 (FIG. 14) onboard and connected to the base 286. In one example, wheels 292 provide for omni-direction movement of the AGV2 74. The actuators 294 are connected to and/or in communication with a power source, for example a rechargeable battery, 296 and an onboard control system 430E (see FIG. 14). Control system 430E is in communication with one or more of the control systems described herein, for example central control system 430A and/or regional control system 430B.

AGV2 74, similar to AGV1 40, is an autonomously propelled and guided automated guided vehicle device which can receive wireless data signals from the central control system 430A and/or regional control system 430B, the control system for the make-up module and/or the control system for the transfer cell, to instruct the AGV2s 74 to be individually propelled and navigated to assigned locations. The data signals received by each AGV2 74 from the central control system 430A and/or regional control system 430B can be processed by the onboard control system 300 which in turn actuates features and functions on the AGV2 74 to carry through the received instructions, for example actuate electric motors 294/440 for the AGV2 74 wheels 292 to move the AGV2 toward an assigned location. It is understood that AGV2 74, can have the same or different structures, control systems, features, functions and operation than AGV1s 40.

In an alternate example of AGV2 74, and as similarly described for an alternative example of AGV1 40, AGV2 74 can include one or more sensors 304,442 in communication with the control system 300, to self-propel or self-navigate AGV2 74. In one example, AGV2 74 can communicate and coordinate with local control system for the transfer cell 78, central control system 430A, and/or regional control system 430B. In this example, it is understood that onboard control system 300 may also communicate with other control systems in the system 10.

Powered Roller Platform

Still referring to FIG. 9, AGV2s 74 can include an exemplary powered roller platform 320 as generally shown. Roller platform 320 is useful in combination with the AGV2 74 to move containers 80 between delivery carts 86 and AGV2s 74 as described further below. Exemplary roller platform 320 includes a relatively low profile base 324 having a longitudinal axis 328 and a plurality of elongate rollers 330 rotatably connected to the base 324. In one example, roller platform is a separate device that is removably secured to the AGV2 74 base 288. In an alternate example, the roller platform 320 may be integral to the structures of AGV2 74 base 286.

In the example, rollers 330 rotate about respective axes parallel to the longitudinal axis 328 thereby assisting movement of containers 80 in a direction transverse to the longitudinal axis 328. It is understood that different forms, greater or lesser numbers, types, and configuration of rollers 330 may be used. Rollers 330 may further have different orientation and rotation relative to base 324 to suit the application and as known by those skilled in the art.

Exemplary roller platform 320 further includes one or more actuators, for example electric motors, 336, 440 connected to the rollers 330 to selectively rotate the rollers 330 relative to the base 324. Actuator 336, 440 is connected to and/or in communication with a power source 340, 446, for example a rechargeable battery, and a control system 430E (for example see the components of control system 430 in FIG. 14). The roller platform 320 power source and control system 430E may be the same as, or a part of, the described control system 300 of the respective AGV2 74. Roller platform 320 may further include one or more sensors 350, 442 to, for example, detect if a container 80 is positioned on the roller platform 320. Other components and configurations of roller platform 320 may be included to suit the particular application and performance requirement as known by those skilled in the art.

Transfer Containers

Referring to FIGS. 10-13, several examples of containers 80 are shown. In a first example shown in FIG. 13, container 80 is a unit load device 360 (commonly referred to as a ULD). ULDs 360 are heavy-duty, industrial containers commonly used at airports for holding and transporting checked passenger bags 38 from the airport terminals to the airplane (or the airplanes to the terminals). Depending on the size of the airplane, for example a large or wide body-type airplane, ULDs 360, including the loaded bags 38, are loaded in their entirety into the baggage hold or compartment of the airplane and travel with the airplane to one or more destinations. ULD's 360 are generally six-sided, cubic or rectangular-shaped structures, typically having four (4) or five (5) closed sides leaving one (1) or two (2) sides open through which bags 38 are deposited and removed. A hard or soft/flexible panel (not shown) may be used to temporarily close the open side(s). Other forms of ULDs 360 commonly known and used in the industry are equally useful for system 10 than the examples illustrated and described.

Figure 10:
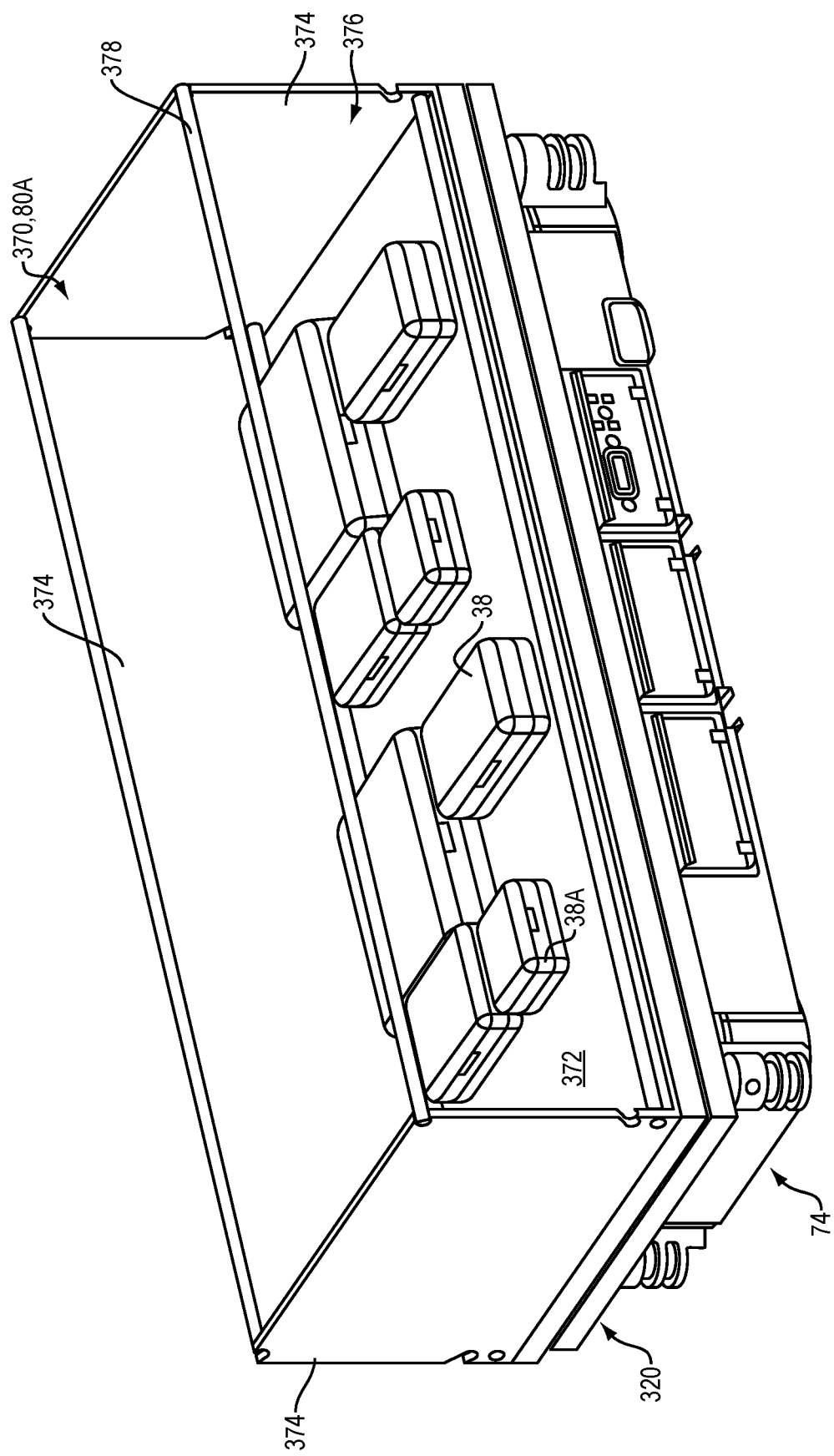
FIG. 10 is a perspective view of the automated guided vehicle in FIG. 9 with an example of a luggage container positioned thereon.

Referring to FIG. 10, an exemplary and alternate container 80A in the form of a carrier 370 is shown (collectively referred to as carrier 370). Exemplary carrier 370 includes a bottom 372, and closed sides 374 (three shown), defining at least an open front side 376 as generally shown. In the example shown, the top is also open. Exemplary carrier 370 further includes a bar 378 spanning the open front side 376 and may be used as a support or hinge to attach a rigid or soft panel (not shown) to close the front side 376 (and open top side as shown). In one example, carrier 370 is sized to be about the same dimensional perimeter of roller platform 320 as generally shown in FIG. 10. In one example, carrier 370 is made from aluminum or ferrous materials suitable for heavy-duty industrial use for the described airport application. Other forms, sizes, configurations, and materials for carrier 370 may be used to suit the particular application and performance requirements.

Figure 13:
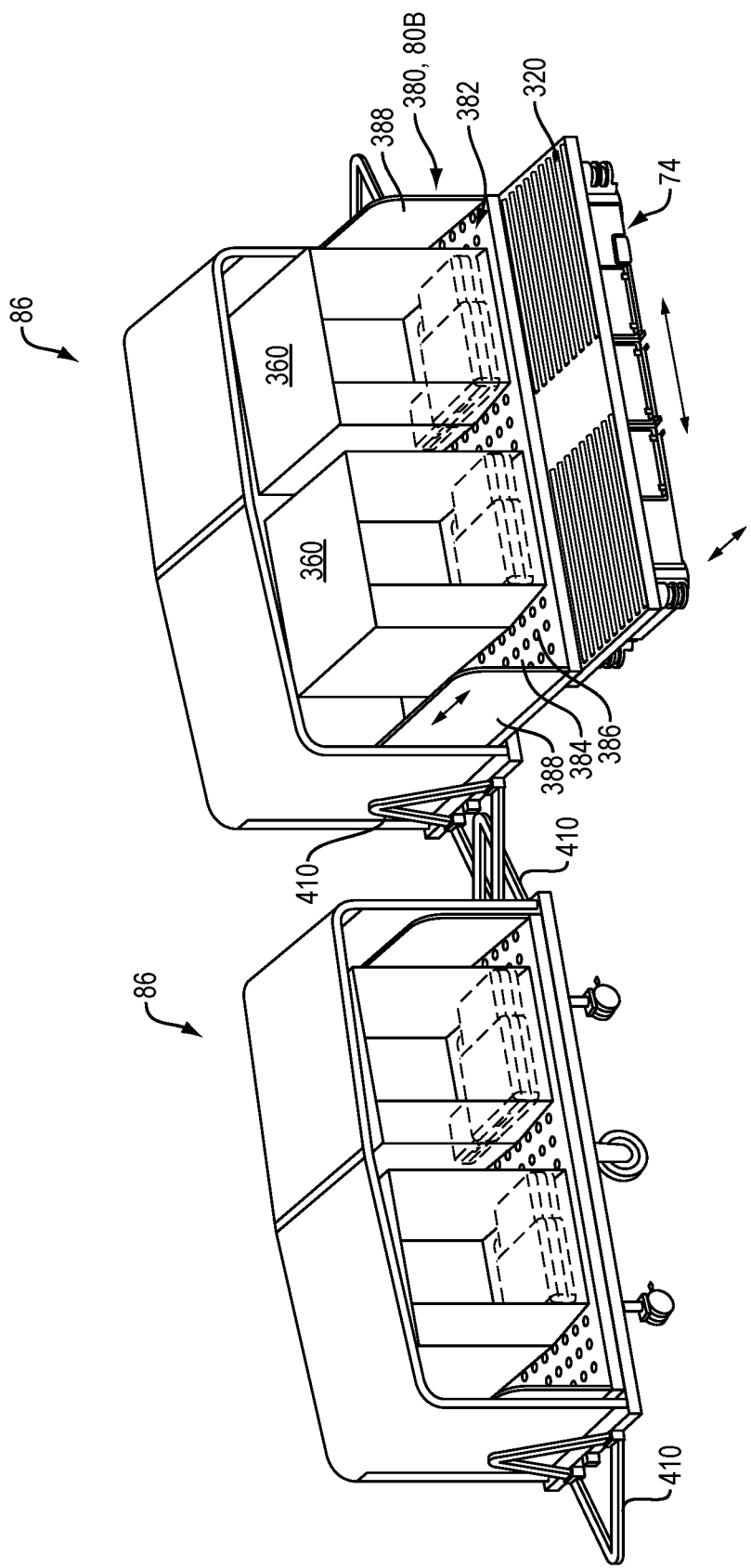
FIG. 13 is a perspective view of two delivery carts each including an exemplary luggage tray that is loaded with exemplary unit load devices and the automated guided vehicle of FIG. 9 according to embodiments of the present disclosure.

Referring to FIG. 13, an exemplary third type of container 80B in the form of a tray 380 is shown (collectively referred to as 380). Exemplary tray 380 includes a base 382 having a top surface 384 and end walls 388 positioned on opposite ends of base 382 as generally shown. In the example shown, each tray 380 includes a plurality of raised portions 386 extending upward from the top surface 384. The raised portions 386 are useful in supporting ULDs 360 while making it easier to move the ULDs 360 onto and off of the trays as best seen in FIG. 13. In one example (not shown), the static raised portions are replaced with an idler roller table for ease of movement of the containers 80 relative to the tray. In one example, a roller ball (spherical ball rollers) or elongated rollers 330 may be used. Alternate roller devices to suit the particular application known by those skilled in the art may be used.

In one example, tray 380 is useful in receiving, supporting and transferring ULDs 360 between carts 86 and the AGV2s 74 as further described below. In the example shown, tray 380 base 382 is sized to be within the dimensional perimeter of roller platform 320 as generally shown in FIG. 13. Similarly, end walls 388 are sized to fit within the interior cavity of cart 86 described further below. Other forms, sizes, configurations, and materials for tray 380 may be used to suit the particular application and performance requirements as known by those skilled in the art. In one example, securement devices, for example clamps, are used to secure the ULDs 360 to the base 382 to prevent movement of the ULDs 360 relative to the respective tray 380 during transport.

Delivery Cart

Referring to FIGS. 7 and 11-13, an example of a delivery cart 86 useful in system 10 is shown. Exemplary cart 86 includes a base 400, sidewalls 404 connected to the base 400 and a canopy 410 connected to the sidewalls 404 as generally shown. The sidewalls 404 and canopy 410 define at least one open side 404 (two open sides shown in FIGS. 11-13) and an interior cavity. Exemplary cart 86 further includes a plurality of wheels 414 (6 shown) for supporting base 400 and permitting rolling advancement of cart 86 of hard surfaces.

As best seen in FIG. 13, each exemplary cart 86 further includes a hitch 420 operable to allow cart 86 to be selectively and temporarily connected to a transport vehicle 90 (FIG. 7) for movement of each cart 86 between the transfer cells 78 and the staging area 94 or departure gates 98 and back again. In one example, cart 86 includes a hitch 420 on each end of base 400 to allow a plurality of delivery carts 86 to be connected together and moved (either by pulling or pushing) by a single transfer vehicle 90 a best seen in FIGS. 7 and 13.

Figure 11:
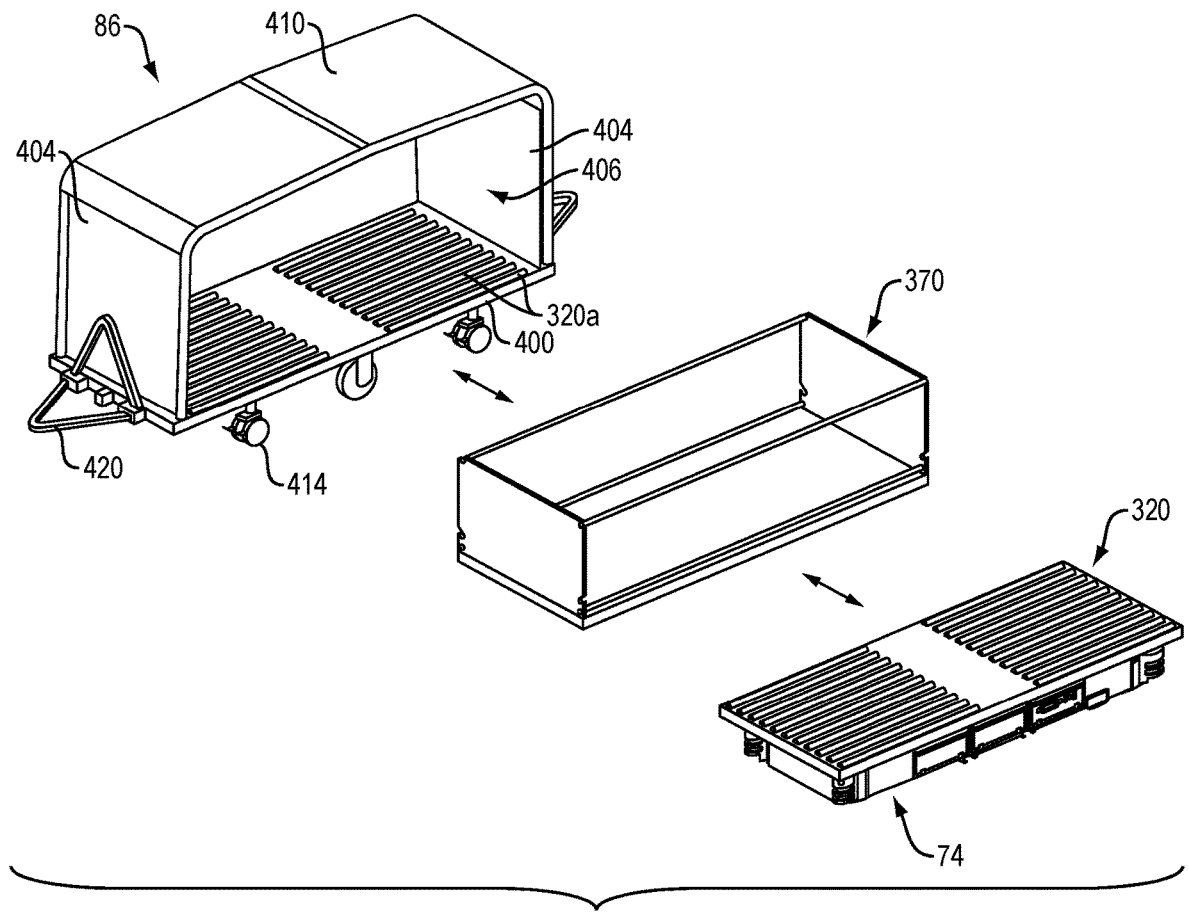
FIG. 11 is an exploded view of an example of the automated guided vehicle with the container of FIG. 10, and an example of a delivery cart according to embodiments of the present disclosure.
Figure 12:
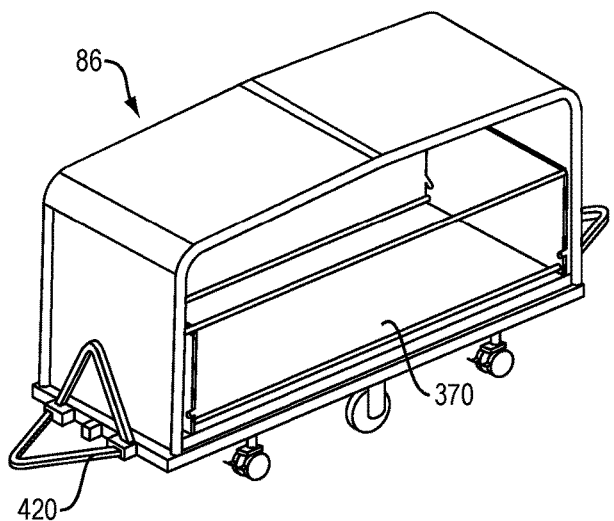
FIG. 12 is a perspective view of an example of an assembled automated guided vehicle, container and delivery cart of FIG. 11.

Referring to FIG. 11, an example of delivery cart 86 includes a roller platform 320A. In one example, roller platform 320A includes the same or similar components and functions as described and illustrated for powered roller platform 320 in FIG. 9 (see FIG. 14).

In one example, the roller platform 320A is not powered, but utilizes idler rollers connected to a non-powered slave drive device. In this example, as the roller platform 320A rollers 330 are not powered, there is no need for the actuators 336, power source 340, or control system 350 as previously described for powered roller platform 320. Sensors 350, 442, a power source 446, and a control system (one or more components of 430 in FIG. 14) may be included in the non-powered roller platform 320A depending on the application and performance requirements of system 10. Other forms, sizes, and configurations for roller platform 320A may be used to suit the particular application and performance requirements as known by those skilled in the art.

In one example where the delivery carts 86 use roller platforms 320A that are not powered (no powered rollers), on positioning and side-by-side alignment of the described delivery cart 86 and AGV2 74, a device, for example what is known as a "parasitic drive"-type device, may be used to initiate the container 80 transfer process. In this example, extend from one of the aligned delivery cart 86 or the AGV2 74 is used to engage the other of the aligned delivery cart 86 or AGV2 74 in order to first activate the appropriate powered roller platform, 320/320A, to begin movement of the loaded/empty container 80 from the AGV2/delivery cart to the other. In one example where an empty container is to be transferred from a delivery cart 86 to an adjacent AGV2 74, on alignment of the AGV2 74 and delivery cart 86, a rotatable shaft (not shown) would automatically be extended laterally from the AGV2 and engage a cooperative receptacle on the delivery cart 86 which is in communication with a drive device (for example belts and pulleys) to rotate the delivery cart 86 roller platform. In the example, when the AGV2 powered roller platform 320 is activated as described above to begin turning its rollers 330, the extended shaft would also begin to rotate thereby rotating the delivery cart roller platform 320A rollers to laterally move the container 80 toward the AGV2 74. Once the container engages the AGV2 roller platform 320 rotating rollers 330, the container 80 will be further laterally translated until fully disengaged from the delivery cart 86 and fully supported by the AGV2 74.

As noted above, one or more sensors (for example optical or weight) on the roller platforms 320 and/or 320A (and/or AGV2 and delivery cart 86) may be used to monitor and/or determine engagement or disengagement of the container 80 which can then be used by the respective platform control system(s) to stop rotation of the rollers through deactivation of the actuators (for example electric motors 336,440). Once the transfer is complete, the extended shaft can automatically be retracted or rotated away from the delivery cart 86 prior to forward movement of the AGV2 74 toward the elevator or make-up module 60. The process could also be used for transferring a full container 80 from the AGV2 to an empty delivery cart in the cart exit area 282 (FIG. 7) by rotating the respective platform rollers in the opposite direction. It is understood that the extendible shaft could alternately be connected to the delivery cart 86 and receptacle on AGV2 to suit the particular application. It is further understood that devices and processes other than the described parasitic-type devices may be used to laterally transfer containers 80 between AGV2s and delivery carts 86 where the delivery cart roller platform is not powered (no powered rollers).

In another example of transferring containers 80 between AGV2s and delivery carts 86 where cart roller platform 320A is not powered, a manual or manual-assisted process may be used. In an example where an empty container 80 adjacent to AGV2 74, a human attendant may initiate movement of the empty container from the cart roller platform 320A until the container 80 engages the powered roller platform 320 on AGV2 74. Alternately, where a full container is positioned on an AGV2, a human attendant may simply guide the container from the AGV2 powered roller platform 320 onto the idler rollers of the non-powered cart platform 320A. Other manual or manually-assisted processes may be used as known by those skilled in the art.

In an alternate example of roller platform 320A, a powered roller platform 320A is used as described for roller platform 320 above. In one example, similar to the parasitic drive described above, an extendible electrical receptacle from the AGV2 may be used to engage a complimentary receptacle on the delivery cart 86 to provide electrical power to the roller platform 320A. Other devices and systems to provide electrical power to the delivery cart may be used as known by those skilled in the art.

In one example as best seen in exemplary FIGS. 7, 11-13, carts 86 with empty containers 80 (for example, 360, 370 or 380) are moved and positioned into cart entry area 280 in rows of two, positioned side-by-side, as generally shown in FIGS. 7 and 8. An AGV2 74 is positioned in proximity to an elevator 70 and directly adjacent to the row of delivery carts 86.

In one example of system 10 on positioning and alignment of an AGV2 74 and delivery cart 86 carrying an empty container 80, the powered roller platform 320A may be activated and powered rollers used to translate the empty container 80 toward the awaiting AGV2 74. In one example, the delivery cart control system may receive a data signal from the central control system 430A, or a local or regional control system 430) thereby activating actuators which serve to rotate the platform 320A rollers as described. In the example, simultaneously or a short time period thereafter, the powered roller platform 320 on AGV2 74 may receive a data signal to activate its actuators 294,440 in a manner described to rotate rollers 330 to receive and complete the lateral movement of the container from the delivery cart 86 onto the AGV2 74. In an alternate example, the AGV2 74 roller platform 320 may be signaled to begin rotation prior to movement of the container 80 from the delivery cart 86. It is understood that other devices and methods may be used to activate or initiate the power roller platform 320, and optionally 320A if so equipped, as known by those skilled in the art.

Once a container 80 is detected, moved and positioned on AGV2 74, AGV2 74 receives data signals from the central control system and/or the local transfer cell and/or the make-up module control system in the manner generally described for AGV1s to autonomously propel and guide the AGV2 and empty container to elevator 70 platform 210 through entry 214 for delivery to the make-up module 60 as described above.

As shown in FIG. 7, on return of the AGV2 74 with full container(s) 80 to the transfer cell 78, AGV2 74 receives data signals from one of the above control systems for a new assignment destination and is autonomously propelled and guided off of the elevator 70 platform 210 through elevator exit 220, and into cart exit area 282. As noted above for AGV1, sensors or other devices communicate with the respective control systems to check or verify that an AGV1 40 or an AGV2 74 reach the assigned destination. The respective AGV may then send a signal to the respective control system advising the assignment, for example destination or task, has been completed.

In the transfer cell 78 cart exit area 282, AGV2 74 with a full container 80 is positioned directly adjacent to a row of carts 86 which do not have containers 80. On sensing of adjacent positioning and alignment between the AGV2 74 and delivery cart 86 as described above, for example through sensors on the AGV2 74 and/or carts 86, the AGV2 power roller platform 320 is again automatically activated to forcibly rotate rollers 330 in a direction to laterally move and transfer the full container 80 from the AGV2 back onto a cart 86 through one or more of the alternate examples described above. One or more sensors and/or vision imaging devices may be used to verify that the container 80 is properly positioned on cart 86 prior to movement of the cart. Although illustrated and described on only one side of transfer cell 78, AGV2s 74 may simultaneously operate on both sides of transfer cell 78 through respective elevators 70.

The now empty AGV2 74 receives data signals in the manner described above for a new destination assignment and returns to an AGV2 74 holding or staging area (not shown) until needed, or returns to the cart entry area 280 to receive another empty container 80 as described above to repeat the process. It is understood that alternate devices and methods for transferring empty and full containers 80 between the AGV2s and the carts 86 may be used to suit the particular application and performance requirements as known by those skilled in the art.

Figure 4:
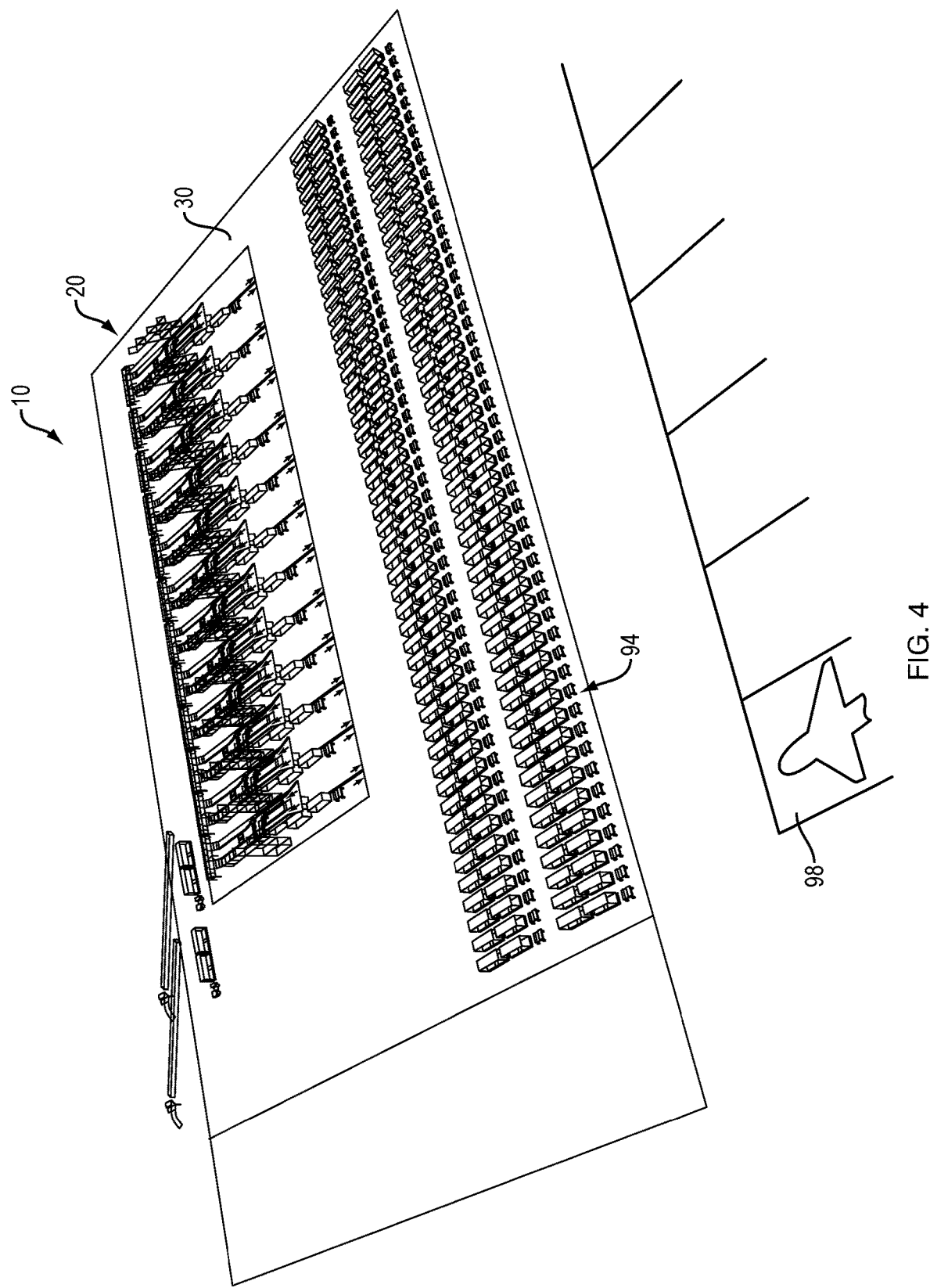
FIG. 4 is a schematic perspective view of one example of a staging area for loaded bag containers awaiting transfer to a flight gate departure area for loading onto airplanes according to embodiments of the present disclosure.

As shown in FIGS. 4, 7 and 8, in an example of system 10, two separate groups or trains of sequential and connected carts 86 without containers 80 are positioned in transfer cell 78 along path of travel 92 as generally shown. As the carts 86 sequentially receive containers 80 full with bags by AGV2s 74 from both sides of path 92, a transfer vehicle 90 may pull or advance the respective train of carts so that an empty cart 86 is available in a predetermined spot for the AGV2 74 with a full container 80 to transfer the container to the cart 86 as described above.

Move Loaded Delivery Carts

Referring to FIGS. 4 and 7, in one example of system 10, once there is a predetermined or sufficient train of connected carts 86 with full containers 80, the transfer vehicle 90 can move the connected carts 86 with full containers from the transfer cell 78 to either a staging area 94 or directly to the aircraft stand 98 for immediate loading of the containers 80 (for example full ULDs 360) onto an awaiting airplane. In one example, the transfer vehicles 90 are also autonomous vehicles or AGVs which autonomously propel and guide the respective vehicles to and from assigned areas based on control systems and receipt of data signals from a central control system 430A, or a local or regional control system 430.

Referring to FIG. 4, system 10 may include a staging area 94 where full containers 86 are temporarily positioned until the predetermined airplane is in position to begin receiving the containers 86 and/or individual bags 38 into the baggage hold or compartments. In one example of staging area 94, the connected trains of carts 86 with full containers 80 are positioned in rows and organized by specific flights in proximity to the flight line 98 as shown in FIG. 4. When the airplane is ready to receive the containers 80 or individual bags, the transfer vehicle 90 re-engages the first in line cart 86 and moves the carts 86 into position to either load the containers 86 directly into the baggage compartment (for example ULDs 360) or individually load the bags 38 into the baggage hold. It is understood that other areas or configurations for temporarily storing loaded containers 80 prior to loading of the containers or bags onto an airplane may be used to suit the particular application.

Additional Battery Charging/Changing Stations

In one example embodiment of system 10, one or more areas along the above described paths of travel may be used to simultaneously recharge the power source(s) 446, for example rechargeable battery (or batteries) of AGV1 40 and AGV2 74. An exemplary charging station 460 for AGV1s is described above. A similar charging station may be positioned and used on the ramp level 30 for AGV2s. Alternately, charging station 460 can also be used to charge or replace batteries for AGV2s. Alternate battery charging stations, devices and processes may be used. For example, as best seen in FIG. 2, one example of a battery recharging or replacement area for AGV1s 40 is the return area 66 following disengagement of a bag 28 and prior to return to the check-in area 34 to acquire another bag 38.

In one example of a recharging area for AGV2 74 that is integral with the existing process as described, one or both of the automated load cells 180 and/or the manual load cell 190 may be used to recharge the AGV2 battery (or other power source) while the AGV2 is idle while the onboard container 80 is being loaded. It is estimated that it may take from 15-20 minutes for a container 80 to be fully loaded in the make-up module 60 which in view of the anticipated run time or duty cycle of the AGV2s 74, is adequate to maintain a sufficient charge of the AGV2 74 batteries. In an alternate example of an AGV2 74 battery recharging or replacement area, the AGV2 is recharged while AGV2 74 is positioned adjacent to delivery carts 86 in cart entry area 280. Alternately, the AGV2 74 can replace the power depleted battery with a fully charged battery.

In the above described recharging examples, an AGV2 docking station (not shown) may be positioned in automated load cell 180, manual load cell 190, and/or cart entry area 280. In this example, the AGV2 74 would engage the charging docking station to recharge the onboard battery. In one example, the exemplary docking station may include a movable electrical receptacle which advances to engage a reciprocal and complimentary electrical receptacle on the AGV2 74 to transfer electrical power to charge the power source 296, 446. The docking station may further include similar devices to charge powered roller platform 320 if platform 320 includes an independent power source 340. A similar docking station (not shown) and charging process may further be used on the first level 26 to charge AGV1s while positioned in return path 66, the screening area 46, the flight staging lanes 56 or other areas. Other areas within system 20, devices and methods, and the positions thereof, may be used to charge the AGV1s and AGV2s.

Control and Communication Systems

Referring to FIG. 14 a schematic of an exemplary control system 430 is shown. Instances of the illustrated control system including control system hardware components together, or combined with additional hardware, can be separately embodied by each of the control systems described above (e.g., embodiments of the central control system 430A, regional control system 430B, control system 430C for make-up module, control system for transfer load cell, control systems 430D onboard AGV1s 40, and control system 430E onboard AGV2s 74, which can be collectively referred to as control system 430 unless otherwise noted).

In the FIG. 14, control system 430 includes a computing device, or multiple computing devices, working cooperatively. The exemplary control system computing device includes common hardware components, including but not limited to, a processor 432, data memory storage device 434, one or more controllers (including but not limited to programmable logic controllers (PLC)) 436, signal transmitter and receiver 438 for sending and receiving signals 450, actuators 440, and sensors 442. These hardware components are in data signal communication with one another, either through hard wire connections or wireless communication protocols, through a bus 448, or other suitable hardware. Other hardware components, including additional input and output devices 444, to suit the particular application and performance specifications can be used. Examples of input devices include, but not limited to, touch sensitive display devices, keyboards imaging devices and other devices that generate computer interpretable signals in response to user interaction. Examples of output devices include, but not limited to, display screens, speakers, alert lights and other audio or visually perceptible devices. Control system 430 can powered by the power source 446.

Exemplary processor 432 can be any type of device that is able to process, calculate or manipulate information, including but not limited to digital information. One example of a processor can be a central processing unit (CPU). Another example of a processor can be a graphical processing unit (GPU). It is contemplated that multiple processors 432 and servers can support at least the central control system 430A. These may be on site at the airport, for example for security concerns, and/or in the "cloud" (cloud computing through remote servers and systems).

The exemplary data memory storage device 434 may include devices which store information, including but not limited to digital information, for immediate or future use by the processor 432. Examples of memory storage devices include either or both of random access memory (RAM) or read only memory (ROM) devices. The memory storage device may be a non-transitory computer readable medium that stores information, such as program instructions that can be executed by the processor 432 and data that is stored by and recalled or retrieved by the processor 432. Additionally, portions of an operating system for the control system 430 and other applications can be stored in the data memory storage device 434. Non-limiting examples of memory storage device 434 include a hard disk drive or a solid state drive. Alternately, portions of the stored information may be stored in the cloud (remote storage devices or data centers) and selectively retrieved through wireless protocols.

In one example of system 10, control system 430 includes a suitable software operating system and preprogrammed software to execute predetermined actions, functions or operations of the mass transit luggage handling system 10 described herein. The operating system and software may be stored in the data memory storage device 434, and processed and executed by the processor 432 through controller 436 and actuators 440.

In many of the above-described examples, system 10, or components thereof, for example AGV1s 40, AGV2s 74, elevators 70, robots 170, 176, power roller platforms 320/320A, and other system 10 devices receive operational instructions and commands through data signals wirelessly streamed in real time from the local control system integrated into one or more of the devices, regional control system 430B, and/or central control system 430A, or other local or central airport control systems. Examples of communication networks that may be in use at an airport or other described applications may include, but are not limited to, large area networks (LAN) or a wide area network (WAN). Examples of wireless communication networks, systems and protocols usable with system 10 include wireless access points for communication based on IEEE standard 802.11 (also known as Wi-Fi). Other wireless communication protocols, for example BLUETOOTH, radio frequency controlled, or 4G or 5G LTE communications, including predecessor and successor systems, suitable for the particular application and performance specifications may be used as known by those skilled in the art. Other wired communication systems and components for communication may be based on IEEE standard 802.3 (also known as the Ethernet) may be used in certain applications. Other forms of communication networks, wired and wireless communication protocols, systems and devices known by those skilled in the art may be used.

In the preferred example described above, the autonomous propulsion and guidance of each AGV1 40 and AGV2 74 is the result of receiving wireless data signals from the central control system 430A and/or regional control system 430B (and/or other control system described herein based on one or more metrics as determined by the central control system 430A and/or the regional control system 430B). In one example, the data signals from the central control system 430A may be supplemented or aided in part from data gathered by the individual AGV1 40 and/or AGV2 74 and communicated to the central control system 430A (or alternately a local control system or regional control system 430B in communication with the central control system 430A). Each AGV1 40 or AGV2 74 may scan, read or otherwise acquire data from one or a plurality of sensors 442 onboard AGV1/AGV2, for example, omni-directional LIDAR (light imaging, detection and ranging), optical sensors, cameras, acoustic sensors, RFID readers, and barcode readers, and can include onboard processing of the received sensor data by the AGV1/AGV2. This data may be wirelessly sent to the central control system 430A and/or regional control system 430B for analysis or calculations to aid, supplement and/or determine the signals sent from the central control system 430A and/or regional control system 430B to the AGV1 40 and/or AGV2 74 to instruct AGV1 40 and/or AGV2 to be autonomously propelled and guided along the assigned path(s) of travel to assigned destination as described herein. Other types and forms of sensors 442, and positional monitoring and navigation systems may be used including, but not limited to, global positioning satellite (GPS) systems, general navigation satellite systems (GNSS), triangular positioning devices, acoustic sensors, laser sensor systems, radar, proximity sensors, inertial sensors (e.g., accelerometers and gyroscopes) and/or visual imaging devices or systems known by those skilled in the art. Other devices, methods and processes for autonomously propelling and guiding the AGV1 40 and AGV2 74, as well as the other system 10 devices as well, can be used.

As noted above, exemplary AGV1/AGV2 may further include additional navigation and guidance sensors and processing to maintain a predetermined distance from, and avoid collisions with, other AGVs and equipment. In another example, additional system 10 or AGV1/AGV2 sensors 442, for example local or central imaging devices in the form of video cameras or other imaging devices in communication with central control system 430A, regional control systems 430B, and/or local control system onboard one or more device in the system 10 may be used to selectively or continuously monitor important AGV1/AGV2 operations for quality control and preventative maintenance purposes. Other autonomous devices and systems can be used depending on the application and performance requirements.

Figure 15:
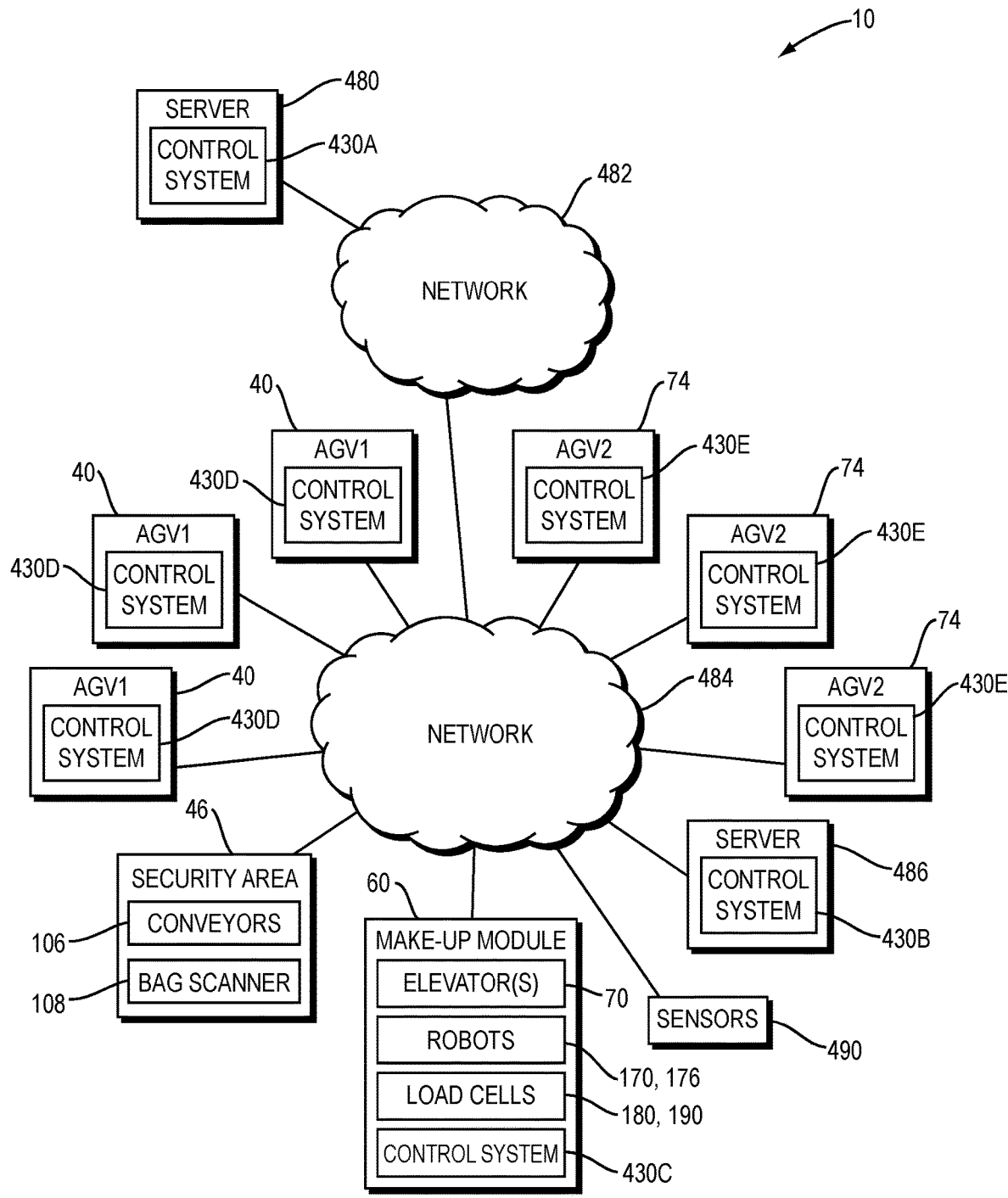
FIG. 15 is a block diagram illustrating an example embodiment of the system 10.

FIG. 15 is a block diagram that illustrate a portion of an example embodiment of the system 10. As shown in FIG. 15, central control system 430A can be part of a server 480 that can communicate via computer networks 482 and 484 (or directly) with the regional control system 430B on a server 486 as well as with the bag scanner 108 in the security area 46, the control system 430C of the make-up module 60, the control system 430D of each of the AGV1s 40, the control system 430E of each of the AGV2s 74, and sensors 490. The sensors 490 distributed in the system 10 for imaging bags, tracking bags, trays, AGV1s 40, for determining whether the system is functioning correctly AGV2s 74, and for detecting errors in the system 10. The sensors 490 can include LIDAR (light imaging, detection and ranging), optical sensors, infrared sensors, radiofrequency detectors, pressure sensors, cameras, depth sensors, acoustic sensors, laser sensor systems, radar, proximity sensors, inertial sensors (e.g., accelerometers and gyroscopes), RFID readers, and barcode readers. The bag scanner 108 in the security area 46, AGV1s 40, the AGV2s 74, the make-up modules 60, servers 480 and 486, and sensors 490 can communicate with each other via the networks 482 and 484 (or directly). The networks 482 and 484 can be any suitable communication and/or data network that facilitate communication between the devices and control systems 430 described herein to enable the devices and control systems 430 to perform the functions and operations described herein in the system 10. As an example, the networks 482 and 484 can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Description of Process of Operation

Referring to FIGS. 16A-D, an example of a method 500 for a mass transit luggage handling system, for example with the previously described system 10, is shown. As noted above for system 10, it is understood that method 500 is useful in applications other than mass transit airports.

In an exemplary first step 505, passenger checked bag(s) (e.g., bags 38) are received at a bag check-in area 34. In exemplary step 505, bag coded or data tags are generated from, for example a Departure Control System (DCS), and attached to each bag as described herein. In one example, one or more control systems (e.g., control system 400—central control system 430A, regional control system 430B, local control system 430C for the make-up module, control system 430D onboard the AGV1s) receives the data that is printed on the tags and associates the data with an image or point cloud image for further use by the system, for example, if a bag tag becomes damaged or unreadable.

In exemplary step 510 each bag is placed on a conventional endless conveyor adjacent the check-in area (e.g., check-in area 34) and routed out of check-in area. In one example, each bag is routed through a bag tag scanning device in communication with the control system. The bag tag scanner scans/reads, or otherwise receives, the bag unique ID, and optionally other information on the bag tags, to positively identify the bags. This bag identification is communicated to the control system by a physical data cable or other communication devices and methods. In one example described above, each bag is automatically deposited onto an AGV1 (e.g., AGV1 40), for example by a conveyor into a tray of an awaiting AGV1. The AGV1 and tray each have a unique identification registered and stored in the control system as described herein. A single AGV1 can receive a single one of the bags or can receive multiple bags. The control system registers the specific AGV1, tray and onboard bag(s), calculates, or otherwise determines, and assigns one or more paths of travel and the intermediate and final destinations or areas for that particular AGV1 and onboard bag(s) based on the received passenger information, for example flight number, and/or bag metrics, as described herein. The control system then sends one or more wireless data signals to the AGV1 to instruct the AGV1 to be propelled and guided to the assigned area(s), for example scanning area (e.g., scanning area 34) and flight staging lane (e.g., flight staging lane 56), as described herein. Other devices and methods for depositing bags onto an AGV1s, and registering the unique identifications of the specific AGV1, tray and bag(s) can be used.

In step 520, the AGV1 autonomously moves to transfer the onboard bag(s) to a security screening area (e.g., security screening area 46) wherein contents of each bag are scanned and/or manually examined for dangerous or other materials as described herein. As described above, in one example, the tray and onboard bag(s) are automatically removed from the AGV1 and deposited onto a scanning conveyor (e.g., scanning conveyor 106) and through scanner (e.g., scanner 108). The specific AGV1 is autonomously propelled and routed around or by the scanner 108 and positioned to receive the same bag(s) exiting the scanner as described herein.

In an alternate step, as described herein, if a bag is quickly cleared, for example within a predetermined period of time, the AGV1, tray and onboard bag(s) 38 can be autonomously propelled and guided to an assigned flight staging lane 56 described herein. In in alternate step and described herein, the AGV1s and onboard bag(s) can be autonomously propelled and guided to a bag queueing area (e.g., bag queueing area 114) to await determination of passage by the screening area (e.g., scanning area 46). In one example described above, selected AGV1s can be autonomously propelled and guided back upstream to be rescanned and deposited on the scanning conveyor (e.g., scanning conveyor 106) for rescanning through a scanner 108 to begin the bag scanning process again. In another exemplary step described herein, bags that are not cleared or are rejected can be autonomously propelled and guided from the bag queueing area to a resolution or manual inspection area (e.g., manual inspection area 120) for manual inspection as noted by the AGV1. Once cleared by security scanning, the AGV1s positioned in the bag park area (e.g., bag park area 114), those that were rescanned, or those in the resolution area, can autonomously propelled and guided to an assigned flight staging lane (e.g., flight staging lane 56), or flight holding area, by the control system based on, for example, the flight number as described herein. Other steps and processes for security scanning bags can be used.

In exemplary step 530, as described above, once the bag(s) are cleared from the scanning area (e.g., scanning area 46), each AGV1 and onboard bag(s) can be autonomously moved into one, or one of a plurality, of a sorting path of travel wherein each AGV1 is routed to an assigned flight staging lane (e.g., flight staging lane 56). In one example, the flight staging lane can be assigned to receive AGV1s based on one or more metrics, for example flight number, as described above.

On the AGV1 40 reaching the location of the assigned flight staging lane, in step 540, the AGV1 enters the assigned flight staging lane and is sequentially ordered with other AGV1s that previously entered the flight staging lane as noted. In an alternate step, each AGV1 is further sorted, autonomously moved and/or sequenced through signals from the control system 430, within lane 56. In an alternate step, each AGV1 can be further sorted, moved and/or sequenced in a similar manner described above bag metric defined by the particular coded bag tag. In one example described above, AGV1s with large or heavy bags can be routed and positioned in flight staging lane prior to smaller or lightweight bags.

Figure 16A:
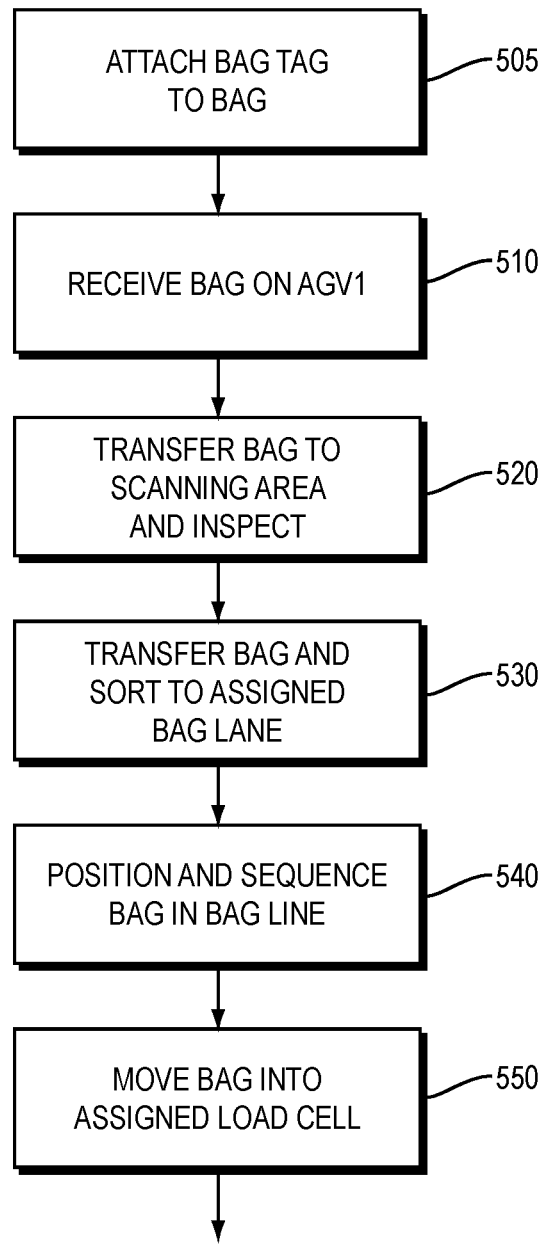
FIGS. 16A-D includes schematics of examples of a process, and subprocesses, for receiving, sorting, routing, and loading passenger checked bags into containers for further processing according to embodiments of the present disclosure.
Figure 16B:
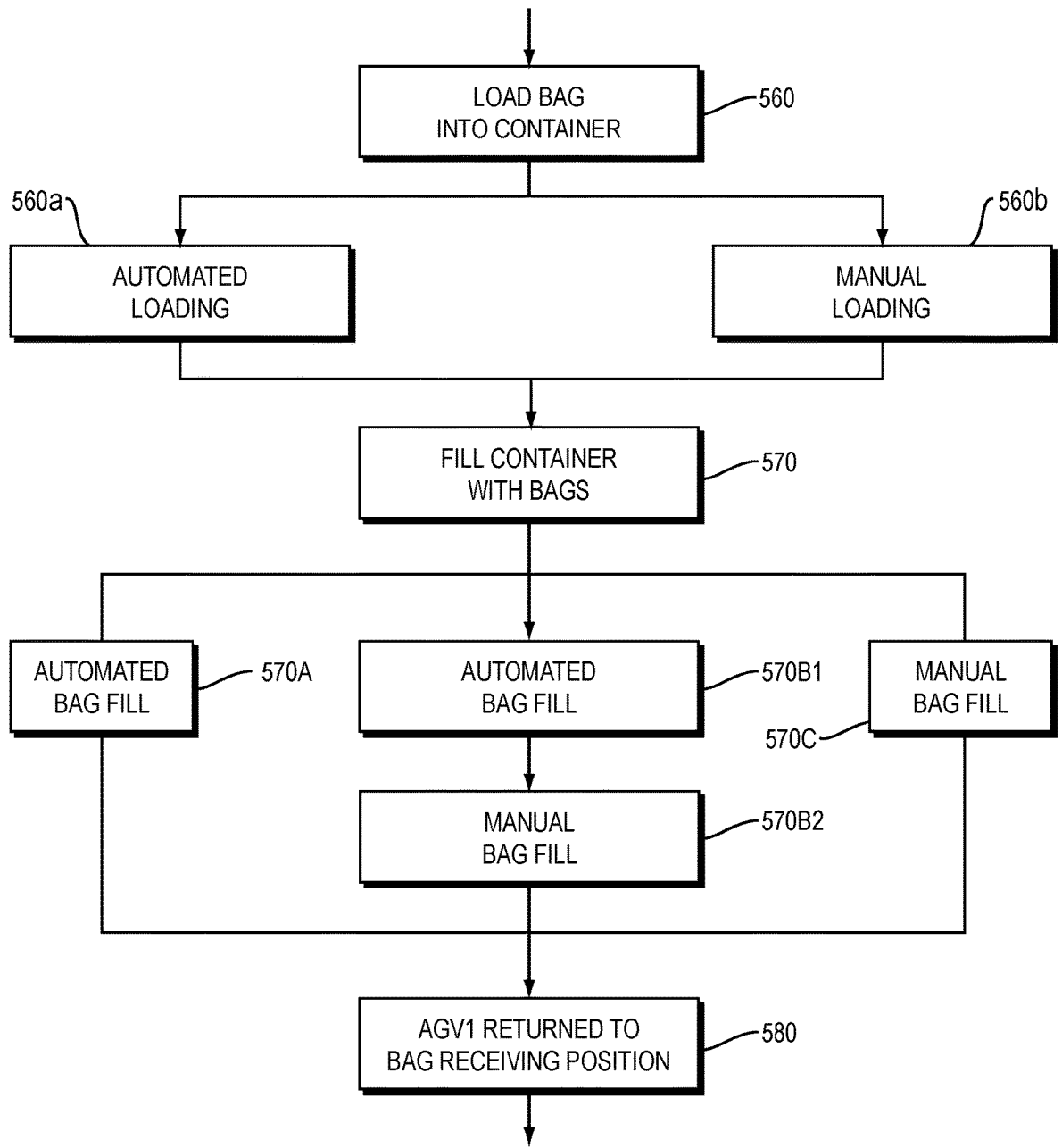

In exemplary step 550, each AGV1 and onboard bags selectively and autonomously moves from the respective flight staging lane into an assigned one of the make-up modules (e.g., make-up modules 60) for loading of the bag into containers (e.g., containers 80) described herein. Referring to FIG. 16B, in exemplary method 500 step 560, the bag(s) onboard the AGV1s in the make-up modules are removed from the AGV1s and deposited into awaiting containers supported by AGV2s (e.g., AGV2s 74).

In one exemplary bag loading step 560A, selected or assigned AGV1s are independently and autonomously propelled and routed by the control system adjacent to an automated load cell (e.g., automated load cell 180). In one example noted above, the AGV1 is propelled, guided to, and temporarily stopped adjacent the automated load cell based on one or more of the bag metrics such as bag type, size and weight that is determined suitable for automatic loading by system 10. In exemplary automated load cell, an automated device, for example preprogrammed, multi-axis robots (e.g., robots 170, 176 engages the onboard bag(s), removes the bag(s) from the AGV1, positions the bag(s) in an interior cavity of a container positioned in the automated load cell, and deposits the bag(s) into container through release of the bag(s). It is understood that other automated devices other than multi-axis robots, and in different quantities, construction and function can be used.

In an complimentary and/or alternate, and exemplary bag loading step 560B, selected or assigned AGV1s are independently and autonomously routed adjacent to a manual load cell (e.g., manual load cell 190) as described herein. As described for automated load cell, the control system assigns or otherwise determines based on, for example registered bag metrics for the particular onboard bag(s) 38, and autonomously propels and guides AGV1 in the make-up module to a manual load cell. This can occur, for example, if the registered or stored bag metrics for the particular bag(s), for example based on the type, size and/or weight of a bag, are not be suitable for automated loading in cell. In manual load cell, a human bag handler removes the bag(s) from the AGV1 40 and deposits the bag(s) into a container positioned in the manual load area.

In exemplary step 570, the respective containers are loaded with bags until preferably filled to 100 percent capacity as noted above. It is understood containers may be filled to a predetermined target level or capacity less than 100 percent capacity.

In a first example of step 570, in step 570A, a container positioned at an automated load cell is completely filled to 100 percent capacity, or a predetermined capacity, by one or both exemplary robots. In an alternate step 570, step 570B1 and 570B2 use a combination of partial automated loading of the container 570B1 at the automated load cell, followed by partial manual loading 570B2 at a manual loading cell as described above. In the example illustrated in FIGS. 6 and 7 for system 10, on automated loading with as many bags into container as is reasonably and efficiently as possible, AGV2 74 and onboard, partially-filled container can be transferred from automated load cell to manual load cell. In step 570B2 in manual load cell, a human bag handler can remove the bags from awaiting AGV1s and position the bags in the remaining open positions in the container to fill the container to full capacity, or other predetermined capacity.

In an alternate step 570C, the container is filled to capacity with bags, or filled to a predetermined amount, through use of only manual loading at manual loading cell in the manner described above for step 570B2.

In one example of steps of 570A, 570B1 and B2, and 570C, it is an object of method 500 that the containers be filled to capacity with bags, or filled to the greatest extent possible or to a determined target, so as to maximize the efficiency of internal cavity space in the containers. This is especially important for containers in the form of ULDs (e.g., ULDs 360) which are commonly loaded into the baggage holds of wide body airplanes. It is further an important improvement of the system 10 that each container is loaded with the proper bags that are designated for a specific flight. This avoids unloading or further sorting of bags once they are loaded into a container.

In an alternate step, steps 570A, 570B1, and/or 570C further sort or sequence bags into the containers according to one or more bag metrics of each bag. As discussed herein, AGV1s and the onboard bag(s) can be organized or sorted in flight staging lanes according to one or more of a plurality of bag metrics as translated from the respective coded bag tag information, or other bag metric information source. For example as shown in FIG. 3 and described herein, the bag may be sorted by size or weight in lane(s).

In one example noted above, the AGV1s with large bags positioned in flight staging lane may be first advanced into the assigned make-up module and loaded into an empty container prior to advancing AGV1s with small bags positioned in the flight staging lane. This allows for larger (or heavier) bags to be loaded at the bottom of an empty container which aids packing efficiency and protection of smaller bags from getting crushed or damaged. This step would equally apply to a bag metric based on weight. In one example, determination of the order AGV1s with onboard bags can be sequentially advanced from lanes into the assigned make-up module for loading of the bags by the robots into a container is made by the control system based on one or more metrics discussed herein. Other devices and systems for selective, or prioritized, loading of bags into containers can be used.

In step 580, on removal of the bag(s) from the AGV1, the AGV1 is automatically and autonomously propelled and guided back along AGV1 return path (e.g., return path 66) to the bag check-in to receive another bag, or to a staging area or charging area until needed, to begin another process 500. In an alternate step, the AGV1s can be autonomously propelled and guided in the manner described herein to a battery charging station (e.g., battery charging station 460) wherein the battery is checked, charged and/or replaced as needed prior to returning for continued service.

Figure 16C:
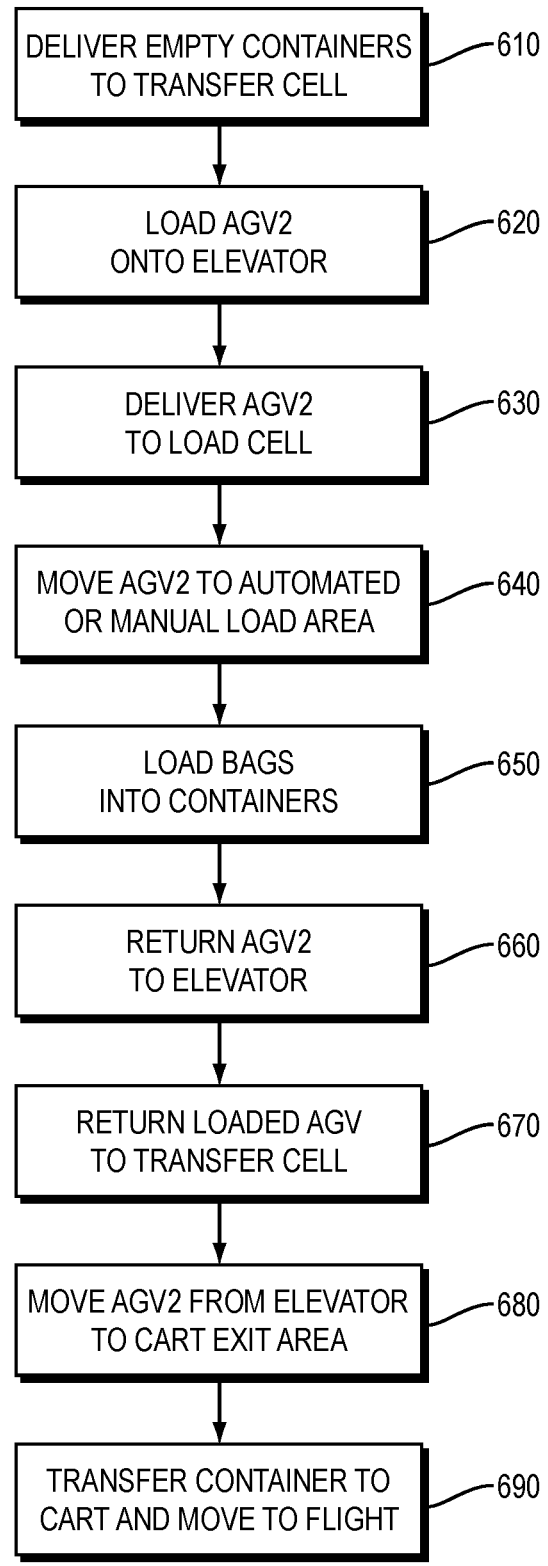

FIG. 16C shows a method 600 (a sub-method of method 500) for simultaneous and coordinated delivery of empty containers (e.g., containers 80), loading containers in make-up modules (e.g., make-up modules 60), and return of full containers, between transfer cell(s) (e.g., transfer cells 78) and make-up modules(s) as described herein for system 10. In method step 610, AGV2s (e.g., AGV2s 74) with one or more empty containers (for example 360, 370, and/or 380) are independently and autonomously propelled and guided to transfer cell, for example to a cart entry area (e.g., cart entry area 280), as shown in FIG. 7. In the example shown for FIG. 7 and described herein, in step 620 each AGV2 can be sequentially guided onto an elevator (e.g., elevator 70) and raised from a first (for example lower) position (e.g., first position 230) to a second (for example upper) position (e.g., second position 236), and delivered into make-up module in step 630. As described herein, alternately, AGV2s are propelled and guided along angled ramps between transfer cell and the assigned make-up module.

In make-up module, step 640 includes each AGV2 with an onboard empty container(s) autonomously propelled and guided to either the automated load cell or the manual load cell for receipt of bags as described herein.

In step 650, each container is filled in a manner described herein in steps 570A, 570B1-2, or 570C.

As described herein, when a respective container is full, or filled to a predetermined level, exemplary step 660 includes each AGV2 independently and autonomously propelled and guided back onto the elevator, and moved from the second position (for example upper position 236) to the first position (for example lower position 230) back to the transfer cell on ground/ramp level (e.g., ground/ramp level 30) in step 670.

In an alternate process step, operation of the make-up module always moves AGV2s and filled containers from the automated load cell to the associated manual load cell prior to traveling on the elevator back to the transfer cell. In this example, assignment to the AGV2 to travel to the manual load cell can be advantageous for a rapid manual inspection by the handlers to ensure proper loading and containment of the bags in the container. Further manual processes for example closing the open side of the container with the onboard container door or soft cover can be completed in the manual load cell prior to traveling to the transfer cell.

In step 680, the loaded AGV2 can be independently and autonomously propelled and guided from the elevator, for example into a cart exit area (e.g., cart exit area 282 as shown in FIG. 7). In one example described above and further described herein, in step 690, loaded container(s) are removed from the AGV2 onto a delivery cart (e.g., delivery cart 86) and transferred directly to the aircraft stand (e.g., aircraft stand 98) for loading onto the airplane, or a staging area (e.g., staging area 94 shown in FIG. 4) where the bags are organized until transported to the departure gate (e.g., departure gate 98). It is understood that the AGV2 can transport the loaded container to the staging area, the flight gate, or some other area.

In one example step where there are two or more elevators on one or both sides of make-up module, AGV2s in the make-up module or transfer cell, can sense through sensors, or be directed by the control system (e.g., control system 400—central control system 430A, regional control system 430B, local control system 430C for the make-up module, control system 430E onboard the AGV2s), to bypass the nearest elevator (or ramp) and move to an alternate and designated second elevator (or ramp). For example, if an elevator in a make-up module becomes inoperable or is backed up with awaiting AGV2s, an empty or loaded AGV2 may propel passed the nearest elevator 0 (or ramp) and travel toward the next or adjacent elevator (or ramp) to keep bag throughput in system 10 operating at a maximum, or pre-determined, rate. In one example, sensors (e.g., sensors 304, 442) on the AGV2s, and/or in combination with the control system (e.g., control system 400—central control system 430A, regional control system 430B, local control system 430C for the make-up module, control system 430E onboard the AGV2s), may direct and autonomously propel and guide the AGV2 to an alternate or nearby elevator (or ramp) to keep a steady flow of AGV2s moving into and out of the make-up modules and transfer cells. This flexibility to adjust to inevitable equipment breakdowns, process throughput bottlenecks, and or necessary maintenance, is an improvement over prior systems which shut down entire systems or areas during equipment or system failures.

Figure 16D:
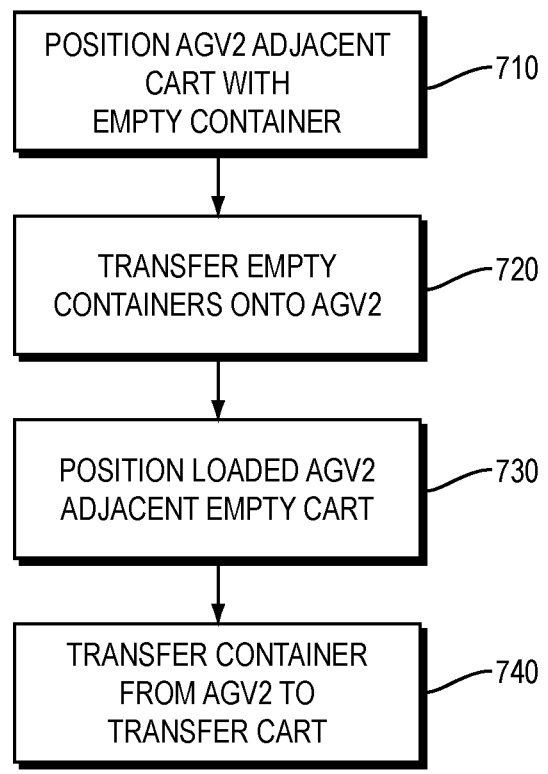

FIG. 16D illustrates a method 700 (a sub-method of method 500) for simultaneous and coordinated loading and unloading of containers (e.g., containers 80) between AGV2s (e.g., AGV2s 74) and delivery carts (e.g., delivery carts 86). As shown in FIG. 7, one of the delivery carts supporting one or more empty containers is positioned in cart entry area (e.g., cart entry area 280) under the control of the central control system (e.g., central control system 430A) and/or the make-up module control system (e.g., control system 430C) as described herein. of the delivery carts can be positioned in rows oriented side-by-side extending upstream of the elevator frames (e.g., elevator frames 200).

In exemplary step 710, an empty AGV2 is autonomously propelled, guided and positioned directly adjacent to a delivery cart as generally shown in the example in FIG. 7. In one step, the AGV2 while awaiting receipt of an empty container in a cart entry area, can be engaged, or in otherwise electrical charging communication with, a power charging device. In one example step, the AGV2 may engage a docking station device which positively and positionally locates the AGV2 in cart entry area thereby aligning the AGV2 with an adjacent cart. This docking station step may also be applied in the cart exit area (e.g., cart exit area 282). Alternate areas to charge the AGV2s can be used.

In an exemplary step 720, the empty container(s) on the delivery cart can be transferred onto the adjacent AGV2 in cart entry area as described herein. In one example, one or more powered or unpowered roller platforms (e.g., platforms 320/320A) can be used on the AGV2s and/or delivery carts. Other devices and steps for manual or automated moving of the container from the delivery cart to the AGV2 can be used.

Following exit of AGV2 with one or more loaded containers by elevator (or a inclined/declined ramp), in step 730 the AGV1 can be autonomously propelled, guided and positioned off the elevator and into a cart exit area. The AGV2 can be positioned directly adjacent to an awaiting empty delivery cart as shown in FIG. 6. Alternate ways to position AGV2s, and alternate areas to charge the power source of AGV2s, can be used.

In step 740, the loaded container is transferred from the AGV2 into an awaiting empty delivery cart. In one or more examples, one or more of the powered or unpowered roller platforms can be used to laterally transfer the loaded container from the AGV2 to a delivery cart. In one example, the sensors (e.g., sensors 244, 304) can be used to confirm the position or registration of AGV2 in a predetermined location as well as position of adjacent delivery cart.

In an exemplary step 750, one or more delivery carts with loaded containers for a specific flight are transferred by a transport vehicle 90 to a flight gate for loading onto an airplane or to a staging area (e.g., staging area 94), or other area, to await delivery to the flight gate for loading as described herein.

In one step, AGV2s can be engaged with a power source charging or replenishing device along a described path of travel or in a designated area in an airport or system 10 as described herein. In an alternate example, one or more areas may change or swap out a depleted battery or power source with a charged power source. In one example charging station (e.g., charging station 460) can be used to charge the AGV2s. Alternate areas to charge the AGV2s can be used.

It is understood that method 500, and sub or independent methods, 600 and 700, may include additional steps, alternate steps, eliminate steps, and conduct the steps in a different order than those described and illustrated as known by those skilled in the art. It is further understood, as well as with system 10, that the inventive methods are not limited to airport and/or passenger checked bag luggage applications. Alternate applications include those described above for system 10. The inventive methods have applications other than for airport and/or passenger checked bag luggage applications.

Figure 17A:
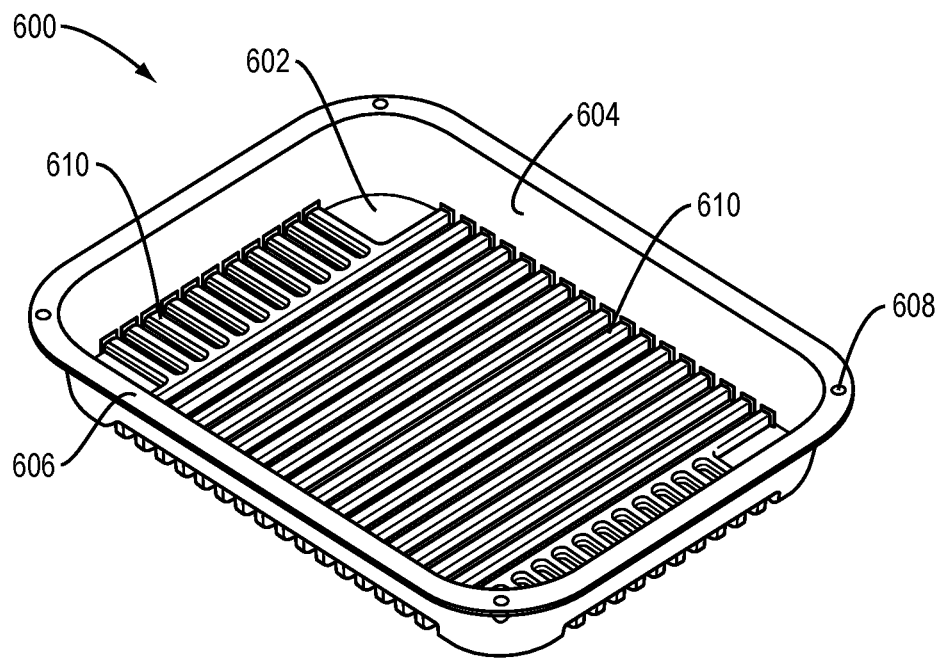
FIG. 17A depicts a top perspective view of an exemplary embodiment of a tray that can be removaby or detachable supported by an autonomous automated guided vehicle.
Figure 17B:
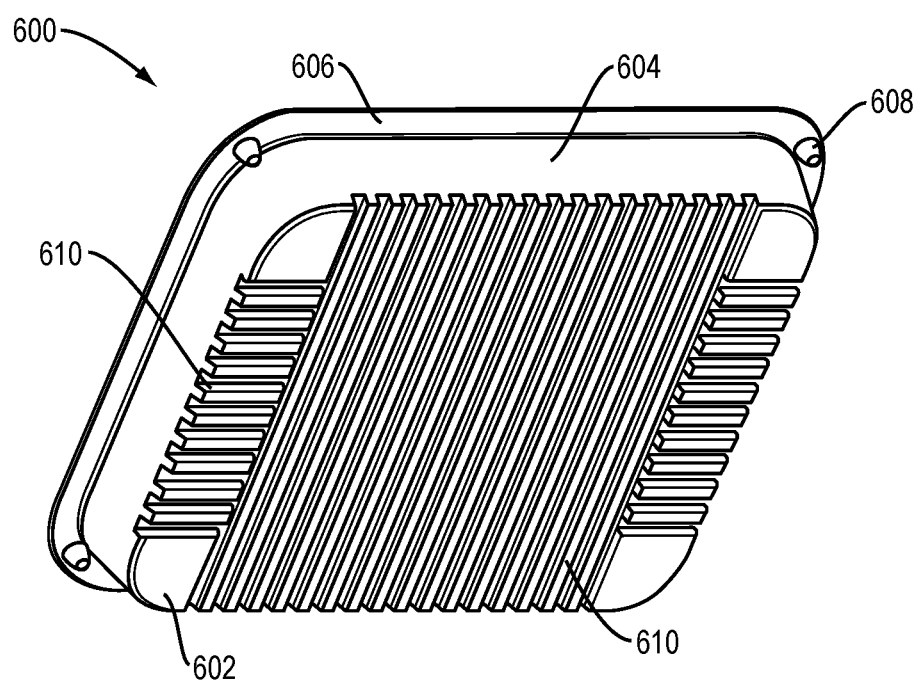
FIG. 17B depicts a bottom perspective view of an exemplary embodiment of a tray that can be removaby or detachable supported by an autonomous automated guided vehicle.

FIGS. 17A-B depicts an exemplary embodiment of a tray 600 that can be removaby or detachable supported by the AGV1s 40 and within which bags 38 can be deposit for transport through the system 10 to the make-up modules 60. As shown in FIG. 17, the tray 600 includes a base 602 and side walls 604. The base 602 of the tray 600 can be rectangular, although the base make be formed in other shapes. The side walls 604 can extend generally perpendicular to the base 602 or can extend from the base at an angle of between forty-five degrees to about one hundred thirty-five degrees relative to the base 602. A portion of the side walls 604 positioned distally away from the base 602 can include a flange 606 that generally extends parallel to the base 602 and/or perpendicularly to the side walls 604. The flange 606 can include dimples 608 or other surface features that can be used to index or register the tray with respect to the AGV1s 40 and to facilitate engagement when one tray is stacked upon and nested within another tray.

The base 602 of the tray 600 can include one or more reinforcing surface structures 610 to provide rigidity and strength to the base 602. As one example, the surface structures 610 can be one or more ridges or waves formed in the base 602. A first set of the surface structures 610 can extend lateral across the base 602 perpendicular to the longitudinal axis of the tray 600. A second set of surface features 610 can extend inwardly for opposing sides of the base 600 perpendicularly to the first set of surface features 610 and can end at the first set of surface features 610.

The specification section headings and subheadings are for organization and reference use only, and are not intended to limit the technical disclosure or claims. While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A baggage handling system for use in high quantity transit airports, the system comprising:
   a plurality of autonomous first automated guided vehicles each operable to receive and autonomously transport a respective bag of a plurality of bags through a security screening area along an assigned path of travel through receipt of data signals from a control system, and to autonomously transport a respective bag to an assigned one of a plurality of flight staging lanes at which the plurality of autonomous first automated guided vehicles are temporarily positioned and queued, the assigned one of the plurality of flight staging lanes being assigned by the control system based on one or more of a plurality of metrics including at least one of flight data or bag data;
   a plurality of make-up modules selectively assignable by the control system or a different control system based on at least one of the plurality of metrics to selectively receive the plurality of autonomous first automated guided vehicles from the plurality of flight staging lanes, the plurality of make-up modules operable to remove the plurality of bags from the plurality of autonomous first automated guided vehicles and to load the plurality of bags into a plurality of containers;
   a plurality of transfer cells positioned in communication with the plurality of make-up modules; and
   a plurality of autonomous second automated guided vehicles, the plurality of autonomous second automated vehicles operable to receive the plurality of containers containing the plurality of bags and transport the plurality of containers to the plurality of transfer cells, each of the plurality of autonomous second automated guided vehicles being assigned to a respective one of the plurality of transfer cells based on one or more of the plurality of metrics.

2. The system of claim 1, wherein each of the plurality of make-up modules further comprises:
   an automated load cell operable to sequentially receive the plurality of autonomous second automated guided vehicles supporting at least one of the plurality of containers; and
   an automated load device operable to selectively remove the plurality bags from the plurality of autonomous first automated guided vehicles and deposit the plurality of bags into the plurality of containers supported by the plurality of autonomous second automated guided vehicles.

3. The system of claim 2, wherein each of the plurality of make-up modules further comprises:
   a manual load cell operable to sequentially receive the plurality of autonomous second automated guided vehicles supporting the plurality of containers, the plurality of containers operable to receive the plurality of bags from the plurality of autonomous first automated guided vehicles by a human operator.

4. The system of claim 2, wherein the automated load cell further comprises a programmable multi-axis robot having an end effector operable to selectively engage and remove the plurality of bags from the plurality of autonomous first automated guided vehicles and deposit the plurality of bags into the plurality of containers supported by the plurality of autonomous second automated guided vehicles positioned in the automated load cell.

5. The system of claim 1, wherein the plurality of make-up modules are positioned on a first level and the plurality of transfer cells are positioned on a ramp level directly below the first level.

6. The system of claim 5, wherein the plurality of make-up modules each further comprise an elevator in communication with the first level and the ramp level, the elevator operable to selectively and sequentially transfer the plurality of containers between the first level and the ramp level.

7. The system of claim 2, wherein each of the plurality of make-up modules comprises:
a pair of automated load cells; and
a pair of elevators, the pair of automated load cells in communication with the pair of elevators.

8. The system of claim 1, wherein each make-up module further comprises:
a first lane and a second lane, each of the first lane and the second lane in communication with the plurality of flight staging lanes, the first and the second lanes defining a make-up module path of travel for sequential passage of the plurality of autonomous first automated guided vehicles through the make-up module.

9. The system of claim 1, wherein the plurality of flight staging lanes, the plurality of make-up modules, and the plurality of transfer cells are positioned within a selectively enclosed environmentally controlled interior space.

10. The system of claim 1, wherein the plurality of metrics utilized to selectively assign each of the plurality of flight staging lanes comprises a specific airplane flight number.

11. The system of claim 1, wherein each of the plurality of autonomous first guided vehicles receives at least one of the plurality of bags between a bag check-in area and the security screening area.

12. The system of claim 11, wherein the security screening area further comprises:
a scanning conveyor;
a bag scanner; and
a rescan return lane operable to provide a path of travel for one or more of the plurality of autonomous first automated from downstream of the bag scanner to upstream of the scanning conveyor to re-sequence the one or more of the plurality of autonomous first automated guided vehicles to facilitate rescanning of the plurality of bags supported by the one or more of the plurality of autonomous first automated guided vehicles by the bag scanner.

13. The system of claim 12, wherein the security screening area further comprises:
an queueing area for the autonomous first automated guided vehicles, the queueing area positioned downstream of the bag scanner, the queueing area operable to temporarily queue selected ones of the plurality of autonomous first automated guided vehicles pending clearance from the scanning area.

14. The system of claim 12, wherein the security screening area further comprises:
a manual bag inspection area positioned remotely from the bag scanner; and
a manual inspection lane, the manual inspection lane operable to provide a path of travel for the selected ones of the plurality of autonomous first automated guided vehicles from downstream of the bag scanner to the manual inspection area.

15. The system of claim 1, further comprising a plurality of delivery carts operable to selectively receive containers supporting the plurality of bags from the plurality of autonomous second automated guided vehicles.

16. The system of claim 15, further comprising:
a powered roller platform connected to a top surface of each of the plurality of autonomous second automated guided vehicles, the powered roller platform further comprising:
a base having a longitudinal axis:
a plurality of rollers each rotatably connected to the base; and
an actuator connected to the plurality of rollers to selectively rotate the rollers to transfer one of the plurality of containers from one of the plurality of autonomous second automated guided vehicles to an adjacent one of the plurality of delivery carts.

17. The system of claim 1, further comprising:
a baggage tray configured and dimensioned to support one or more of the plurality of bags, the baggage tray being removable inserted into at least one of the plurality of autonomous first automated guided vehicles,
the baggage tray being autonomously removed from each of the plurality of autonomous first vehicles while supporting the one or more of the plurality of bags to pass the baggage tray and the one or more of the plurality of bags through a bag scanner of the security scanning area.

18. A method for handling passenger baggage for use in a high quantity transit airport, the method comprising:
sequentially receiving the plurality of bags by a plurality of autonomous first automated guided vehicles, each of the plurality of bags being associated with a respective plurality of metrics including at least one of flight data or bag data;
autonomously transporting the plurality of bags through a security screening area by the plurality of autonomous first automated guided vehicles;
assigning, by a control system, each of the plurality of autonomous first automated guided vehicles to respective ones of a plurality of flight staging lanes based on one or more of the plurality of metrics;
temporarily queuing one or more of the plurality of autonomous first automated guided vehicles in the respective ones of the plurality of flight staging lanes based on the one or more of the plurality of metrics;
selectively, individually and autonomously moving each of the plurality of autonomous first automated guided vehicles from the respective ones of the plurality of flight staging lanes into an assigned make-up module;
removing the plurality of bags from the plurality of autonomous first automated guided vehicles and loading the plurality of bags into one or more containers;
engaging each of the one or more containers with one of a plurality of autonomous second automated guided vehicles;
sequentially, individually and autonomously moving each of the plurality of autonomous second automated guided vehicles from the assigned make-up module to a transfer cell, the transfer cell being assigned based on one or more of the plurality of metrics; and
transferring the one or more containers to one of an airplane gate or a staging area.

19. The method of claim 18, further comprising:
independently and autonomously moving selected ones of the plurality of autonomous first automated guided vehicles positioned downstream of a bag scanner in the security screening area along a rescan return lane to a position upstream of the bag scanner to rescan one or more of the plurality of bags supported by the selected ones of the plurality of autonomous first automated guided vehicles by the bag scanner;

independently and autonomously moving the selected ones of the plurality of autonomous first automated guided vehicles to a queueing area positioned downstream of the bag scanner pending a clearance from the security screening area; or independently and autonomously moving the selected ones of the plurality of autonomous first automated guided vehicles positioned downstream of the bag scanner to a manual inspection area for manual bag inspection.

20. The method of claim 18, wherein removing the plurality of bags from the plurality of autonomous first automated guided vehicles in the make-up module and loading each of the plurality of bags into the one or more containers comprises one of:

selectively removing one or more of the plurality of bags from the plurality of autonomous first automated guided vehicle by an automated removal device and loading the one or more of the plurality of bags into the one or more containers; or selectively removing the one or more of the plurality of bags from the plurality of autonomous first automated guided vehicles by a human operator and loading the one or more of the plurality of bags into the one or more containers.

* * * * *